US010945280B2

(12) United States Patent
Ying et al.

(10) Patent No.: US 10,945,280 B2
(45) Date of Patent: Mar. 9, 2021

(54) USER EQUIPMENTS, BASE STATIONS AND METHODS FOR UPLINK TRANSMISSION WITHOUT GRANT

(71) Applicants: Sharp Kabushiki Kaisha, Osaka (JP); FG Innovation Company Limited, Hong Kong (CN)

(72) Inventors: Kai Ying, Vancouver, WA (US); Tatsushi Aiba, Vancouver, WA (US); Toshizo Nogami, Chiba (JP); John Michael Kowalski, Vancouver, WA (US)

(73) Assignees: Sharp Kabushiki Kaisha, Osaka (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 16/124,704

(22) Filed: Sep. 7, 2018

(65) Prior Publication Data

US 2019/0082450 A1    Mar. 14, 2019

Related U.S. Application Data

(63) Continuation of application No. PCT/US2018/049726, filed on Sep. 6, 2018.
(Continued)

(51) Int. Cl.
*H04W 72/12* (2009.01)
*H04L 1/18* (2006.01)
(Continued)

(52) U.S. Cl.
CPC ....... *H04W 72/1268* (2013.01); *H04L 1/1812* (2013.01); *H04L 1/1822* (2013.01);
(Continued)

(58) Field of Classification Search
CPC ... H04L 1/1812; H04L 1/1819; H04L 1/1822; H04L 1/1861; H04L 1/1864;
(Continued)

(56) References Cited

U.S. PATENT DOCUMENTS 7,925,953 B2 * 4/2011 Malkamaki ........... H04L 1/1819
714/748
8,578,231 B2 * 11/2013 Malkamaki ........... H04L 1/1819
714/748
(Continued)

FOREIGN PATENT DOCUMENTS

WO    2017131813 A1    8/2017
WO    WO-2018231978 A1 *  12/2018   .......... H04W 72/042
(Continued)

OTHER PUBLICATIONS

Huawei et al., On the determination of UE ID and HARQ process for UL grant-free transmission, Aug. 25, 2017, 3GPP, 3GPP TSG RAN WG1 Meeting #90, Tdoc: R1-1712215 (Year: 2017).*
(Continued)

*Primary Examiner* — Eric Nowlin
(74) *Attorney, Agent, or Firm* — Austin Rapp

(57) ABSTRACT

A user equipment (UE) is described that communicates with a base station. The UE includes receiving circuitry configured to receive a Radio Resource Control (RRC) message including first information indicating that limited buffer rate matching is enabled. The receiving circuitry is also configured to receive the RRC message including second information containing a number of repetitions and a redundancy version (RV) pattern. The UE includes processing circuitry configured to apply, according to the first information, limited buffer rate matching for a circular buffer to store coded bits of a transport block (TB). The processing circuitry is also configured to produce RV(s) of repetition(s) of the TB from the circular buffer according to the second
(Continued)

information. The UE includes transmitting circuitry configured to transmit the repetitions of the TB.

4 Claims, 18 Drawing Sheets

Related U.S. Application Data

(60) Provisional application No. 62/556,182, filed on Sep. 8, 2017.

(51) Int. Cl.
    *H04L 5/00* (2006.01)
    *H04W 76/27* (2018.01)
    *H04W 72/04* (2009.01)
    *H04W 74/08* (2009.01)

(52) U.S. Cl.
    CPC .......... *H04L 1/1874* (2013.01); *H04L 1/1896* (2013.01); *H04L 5/0055* (2013.01); *H04W 76/27* (2018.02); *H04L 5/0091* (2013.01); *H04W 72/042* (2013.01); *H04W 74/08* (2013.01)

(58) Field of Classification Search
    CPC .. H04L 1/1874; H04L 5/0055; H04W 72/042; H04W 72/1268; H04W 76/27
    See application file for complete search history.

(56) References Cited

U.S. PATENT DOCUMENTS

| | | | |
|---|---|---|---|
| 9,509,389 B2* | 11/2016 | Seo | H04L 5/0053 |
| 9,860,888 B2* | 1/2018 | Gaal | H04L 5/0005 |
| 10,142,004 B2* | 11/2018 | Park | H04B 7/0456 |
| 10,237,863 B2* | 3/2019 | Ye | H04L 1/1861 |
| 10,568,129 B2* | 2/2020 | Jeon | H04W 72/14 |
| 10,631,319 B2* | 4/2020 | Li | H04W 74/0816 |
| 2002/0075867 A1 | 6/2002 | Herrmann | H03M 13/6306 370/389 |
| 2005/0076283 A1* | 4/2005 | Malkamaki | H04L 1/1819 714/748 |
| 2011/0161766 A1* | 6/2011 | Malkamaki | H04L 1/1819 714/748 |
| 2012/0087396 A1 | 4/2012 | Nimbalker et al. | |
| 2016/0105873 A1* | 4/2016 | Gaal | H04L 5/0005 370/330 |
| 2017/0257851 A1* | 9/2017 | Ye | H04L 1/1896 |
| 2017/0373745 A1* | 12/2017 | Park | H04B 7/0456 |
| 2018/0007731 A1* | 1/2018 | Park | H04W 76/20 |
| 2018/0035409 A1* | 2/2018 | Chmiel | H04L 1/1822 |
| 2018/0110057 A1* | 4/2018 | Park | H04W 72/12 |
| 2018/0219649 A1* | 8/2018 | Ying | H04L 1/1816 |
| 2018/0323909 A1* | 11/2018 | Ying | H04L 1/0072 |
| 2018/0368174 A1* | 12/2018 | Jeon | H04W 72/14 |
| 2019/0037598 A1* | 1/2019 | Hamidi-Sepehr | H04W 74/0816 |
| 2019/0082450 A1* | 3/2019 | Ying | H04W 72/1268 |
| 2019/0141647 A1* | 5/2019 | Nimbalker | H04L 5/001 |
| 2020/0045722 A1* | 2/2020 | Bae | H04W 72/1284 |
| 2020/0146034 A1* | 5/2020 | Bagheri | H04L 1/08 |
| 2020/0177326 A1* | 6/2020 | Jechoux | H04L 1/1854 |
| 2020/0178293 A1* | 6/2020 | Jeons | H04W 72/14 |

FOREIGN PATENT DOCUMENTS

| | | | | |
|---|---|---|---|---|
| WO | WO-2019047232 A1 * | 3/2019 | .......... | H04L 1/0041 |
| WO | WO-2019051071 A1 * | 3/2019 | .......... | H04L 1/1819 |

OTHER PUBLICATIONS

Intel Corporation, UL data transmission without grant, Aug. 25, 2017, 3GPP, 3GPP TSG RAN WG1 Meeting#90, Tdoc: R1-1712592 (Year: 2017).*
Mediatex Inc., Grant-free repetition schemes for UL URLLC, Aug. 25, 2017, 3GPP, 3GPP TSG RAN WG1 Meeting #90, Tdoc: R1-1713717 (Year: 2017).*
Fujitsu, Discussions on HARQ for UL data transmission without grant, Sep. 21, 2017, 3GPP, 3GPP TSG RAN WG1 Meeting NR#3, Tdoc: R1-1715490 (Year: 2017).*
Nokia et al., Remaining issues on UL transmission without grant, Sep. 21, 2017, 3GPP, 3GPP TSG-RAN WG1 Meeting NR #3, Tdoc: R1-1715548 (Year: 2017).*
Zte et al., Further discussion on UL transmission without grant, Sep. 21, 2017, 3GPP, 3GPP TSG RAN WG1 Meeting NR #3, Tdoc: R1-1715562 (Year: 2017).*
Vivo, Support of UL data transmission without grant, Sep. 21, 2017, 3GPP, 3GPP TSG RAN WG1 Meeting NR#3, Tdoc: R1-1715645 (Year: 2017).*
NEC, Remaining issues on UL transmission without grant, Sep. 21, 2017, 3GPP, 3GPP TSG RAN WG1 Meeting NR#3, Tdoc: R1-1715662 (Year: 2017).*
NTT Docomo, Inc., UL data transmission without UL grant, Sep. 21, 2017, 3GPP, 3GPP TSG RAN WG1 Meeting NR Ad-Hoc#3, Tdoc: R1-1716107 (Year: 2017).*
NTT Docomo, Inc., Remaing issues on single UL transmission, Sep. 21, 2017, 3GPP, 3GPP TSG RAN WG1 Meeting NR #3, Tdoc: R1-1716113 (Year: 2017).*
Sequans, UL Transmission without Grant, Sep. 21, 2017, 3GPP, 3GPP TSG RAN WG1 Meeting AH_NR#3, Tdoc: R1-1716117 (Year: 2017).*
International Search Report and Written Opinion issued for PCT Application No. PCT/US2018/049726 dated Dec. 13, 2018.
3GPP TR 38.913 v03.0, "Study on Scenarios and Requirements for Next Generation Access Technologies (Release 14)," Mar. 2016.
3GPP TR 22.862 v1.0.0, "Feasibility Study on New Services and Markets Technology Enablers Critical Communications; Stage 1 (Release 14)," Feb. 2016.
Huawei, HiSilicon, "Overview of URLLC support in NR", 3GPP TSG RAN WG1 meeting #86bis, Lisbon, Portugal, R1-1608843, Oct. 14, 2016.
3GPP TS 36.331, V14.0.0, Evolved Universal Terrestrial Radio Access (E-UTRA); Radio Resource Control (RRC); Protocol specification (Release 14) Sep. 2016.
3GPP TS 36.321, V14.0.0, Evolved Universal Terrestrial Radio Access (E-UTRA); Medium Access Control (MAC); Protocol specification (Release 14) Sep. 2016.
Ericsson, "HARQ handling for SPS UL", 3GPP TSG-RAN WG2 #97bis, Spokane, USA, Tdoc R2-1702666, Apr. 7, 2017.
Ericsson, "On Intra-UE UL Puncturing," 3GPP TSG-RAN WG1 #88bis, Spokane, USA, R1-1706056, Apr. 7, 2017.
Nokia, Alcatel-Lucent Shanghai Bell, "On scheduling of mini-slots within slots," 3GPP TSG-RAN WG1 #88bis, Spokane, WA, United States, R1-1705240, Apr. 7, 2017.
"RAN1 Chairman's Notes," 3GPP TSG RAN WG1 NR Ad-Hoc#2, Qingdao, P.R. China Jun. 30, 2017.

* cited by examiner (a) Example of slots (b) Example of a sub-slot (c) Example of a sub-slot (d) Example of a sub-slot (e) Example of an aggregation of sub-slots (f) Example of an aggregation of slot and sub-slot

USER EQUIPMENTS, BASE STATIONS AND METHODS FOR UPLINK TRANSMISSION WITHOUT GRANT

RELATED APPLICATIONS

This application is related to and claims priority from U.S. Provisional Patent Application No. 62/556,182, entitled "USER EQUIPMENTS, BASE STATIONS AND METHODS FOR UPLINK TRANSMISSION WITHOUT GRANT," filed on Sep. 8, 2017, which is hereby incorporated by reference herein, in its entirety.

TECHNICAL FIELD

The present disclosure relates generally to communication systems. More specifically, the present disclosure relates to user equipments, base stations and methods for uplink transmission without grant.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
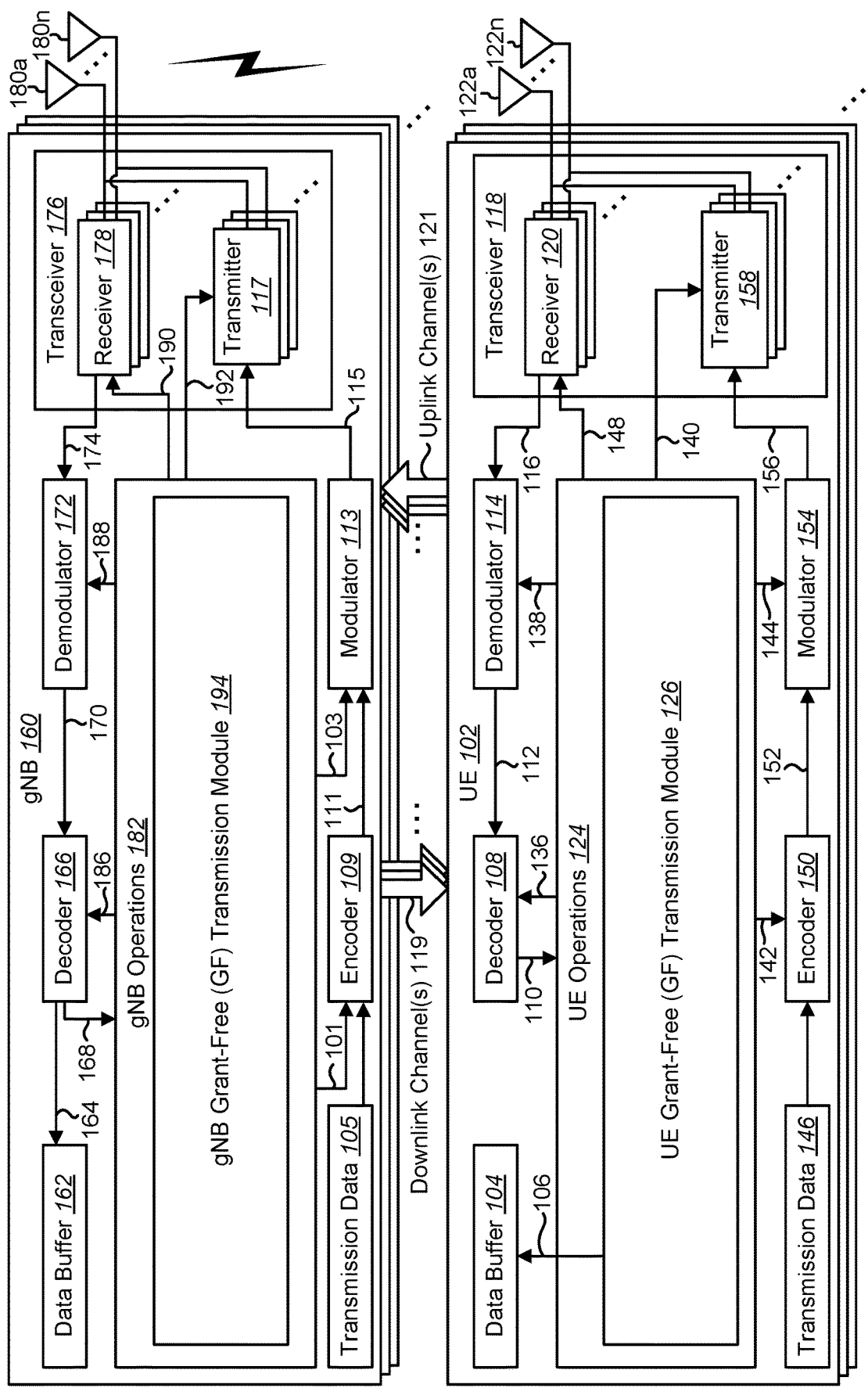
FIG. 1 is a block diagram illustrating one implementation of one or more gNBs and one or more UEs in which systems and methods for grant-free (GF) uplink transmission operations may be implemented.

A user equipment (UE) is described that communicates with a base station. The UE includes receiving circuitry, processing circuitry and transmitting circuitry. The receiving circuitry may be configured to receive a Radio Resource Control (RRC) message including first information indicating that limited buffer rate matching is enabled. The receiving circuitry may also be configured to receive the RRC message including second information containing a number of repetitions and a redundancy version (RV) pattern. The processing circuitry may be configured to apply, according to the first information, limited buffer rate matching for a circular buffer to store coded bits of a transport block (TB). The processing circuitry may also be configured to produce RV(s) of repetition(s) of the TB from the circular buffer according to the second information. The transmitting circuitry may be configured to transmit the repetitions of the TB.

A base station apparatus that communicates with a user equipment (UE) is also described. The base station apparatus that communicates with a UE includes transmitting circuitry, receiving circuitry and processing circuitry. The transmitting circuitry may be configured to transmit a Radio Resource Control (RRC) message including first information indicating that limited buffer rate matching is enabled. The transmitting circuitry may also be configured to transmit the RRC message including second information containing a number of repetitions and a redundancy version (RV) pattern for repetitions of a transport block (TB). The receiving circuitry may be configured to receive the repetitions of the TB. The processing circuitry may be configured to decode the TB according to the first information and the second information.

A communication method of a user equipment is also described. The communication method includes receiving a Radio Resource Control (RRC) message including first information indicating that limited buffer rate matching is enabled. The communication method also includes receiving the RRC message including second information containing a number of repetitions and a redundancy version (RV) pattern. The communication method also includes applying, according to the first information, limited buffer rate matching for a circular buffer to store coded bits of a transport block (TB). The communication method also includes producing RV(s) of repetition(s) of the TB from the circular buffer according to the second information. The communication method also includes transmitting the repetitions of the TB.

A communication method of a base station apparatus is also described. The communication methods includes transmitting a Radio Resource Control (RRC) message including first information indicating that limited buffer rate matching is enabled. The communication method also includes transmitting the RRC message including second information containing a number of repetitions and a redundancy version (RV) pattern for repetitions of a transport block (TB). The communication method also includes receiving the repetitions of the TB. The communication method also includes decoding the TB according to the first information and the second information.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio base station may be referred to as a gNB. A gNB may also be more generally referred to as a base station device.

Some configurations of the systems and methods described herein teach approaches for URLLC transmission/retransmission management to meet the latency/reliability requirement. Some requirements for URLLC relate to user (U)-plane latency and reliability. For URLLC, the target user plane latency is 0.5 milliseconds (ms) each way for both UL and DL. The target reliability is $1-10^{-5}$ for X bytes within 1 milliseconds (ms).

These URLLC-specific constraints make the hybrid automatic repeat request (HARQ) and retransmission mechanism design difficult. For example, the receiver must reply with a quick acknowledgement (ACK) or negative acknowledgement (NACK) or an uplink grant to meet the latency requirement, or the transmitter can retransmit immediately without waiting for ACK/NACK to enhance the reliability. On the other, grant-based or grant-free repetitions are supported to further enhance the reliability. How to terminate the repetitions is also an important issue. The described systems and methods teach URLLC HARQ/retransmission design in different cases.

Some configurations of the systems and methods disclosed herein may provide a hybrid automatic repeat request (HARQ) mechanism design for uplink ultra-reliable and low-latency communications (URLLC).

URLLC UE may support multiple types of uplink transmissions without grant (also referred to as grant-free (GF) uplink transmission or GF transmission). A first type (Type 1) of GF transmission may be a UL data transmission without grant that is only based on RRC (re)configuration without any L1 signaling. The RRC (re-)configuration may include periodicity and offset of a resource with respect to SFN=0, time domain resource allocation, frequency domain resource allocation, UE-specific DMRS configuration, an MCS/TBS value, number of repetitions K, power control related parameters and/or HARQ related parameters (e.g., number of HARQ processes).

In a second type (Type 2) of GF transmission, UL data transmission without grant is based on both RRC configuration and L1 signaling for activation/deactivation for UL data transmission without grant. The RRC (re-) configuration for resource and parameters may include periodicity of a resource, power control related parameters, and may include HARQ related parameters (e.g., number of HARQ processes). L1 signaling indicates other related parameters for the resource, such as offset associated with the periodicity with respect to a timing reference indicated by L1 signaling for activation, time domain resource allocation, frequency domain resource allocation, UE-specific DMRS configuration, an MCS/TBS value. The number of repetitions K may be configured by RRC signaling and/or indicated by L1 signaling.

In another approach, the GF transmission may be a semi-persistent scheduling (SPS) transmission. For semi-static resource allocation (also referred to as semi-persistent scheduling (SPS)), there may be several basic procedures: radio resource control (RRC) configuration (e.g., a RRC message, a RRC signal), activation, UL transmission and deactivation. The RRC configuration may be exchanged between the gNB/eNB and the UE through an RRC layer. And, the RRC signal may be included in a higher layer signal. Some of the parameters (e.g., periodicity, address, allocation, and MCS to be used in the SPS resources) may need to be configured for semi-persistent scheduling. Part of these parameters (e.g., periodicity, address) may be configured semi-statically (SPS Configuration), and the rest may be configured with PDCCH (SPS Activation). For example, the gNB/eNB may configure a periodicity (e.g., a time resource) by using the RRC signal, and may indicate an SPS resource (e.g., a frequency resource) by using DCI format for activation. After UL SPS is configured and activated, the UE has sufficient information of the location of the configured UL grant-free resources that are reserved for fast uplink access. Then, the UE may start UL transmission. In Release 8, the UE keeps transmitting at the configured resources until UL SPS is deactivated explicitly and implicitly. In Release 14, the UE may transmit as needed and skip the configured resources when there is no transport block (TB) for transmission.

In NR, the relationship between SPS and UL transmission may include the following possibilities. In a first case, SPS is a totally different type. In a second case, SPS is equivalent to Type 1. The specification may use SPS instead of Type 1, or may use Type 1 instead of SPS. In a third case SPS is equivalent to Type 2. The specification may use SPS instead of Type 2, or may use Type 2 instead of SPS. In a fourth case, Type 1 is a special case of SPS. In a fifth case, Type 2 is a special case of SPS. In a sixth case, SPS is a special case of Type 1. SPS may be a configuration of Type 1 corresponding to a specific service. In a seventh case, SPS is a special case of Type 2. SPS may be a configuration of Type 2 corresponding to a specific service.

For URLLC, the UE may have one or more kinds of Radio Network Temporary Identifiers (RNTIs). The RNTI may be used to scramble the cyclic redundancy check (CRC) part of the radio channel messages. This implies that if the UE does not know the exact RNTI values for each of the cases, the UE cannot decode the radio channel messages. Examples of RNTIs that may be utilized by a UE are given as follows. One example is a Cell RNTI (C-RNTI). Here, the C-RNTI herein may be assumed to be included in a RNTI "A" in some implementations for the sake of simple description. The C-RNTI may be used for dynamic scheduled unicast transmission.

Another example is Type1 C-RNTI. Here, the Type1 C-RNTI herein may be assumed to be included in a RNTI "B" in some implementations for the sake of simple description. Type1 C-RNTI may be used for dynamic scheduled unicast (re)transmission of Type 1 UL GF transmission. It may be used for parameter reconfiguration/modification and/or grant-free/grant-based transmission switch of Type 1 UL transmission without grant.

Another example is Type2 C-RNTI. Here, the Type2 C-RNTI herein may be assumed to be included in a RNTI "C" in some implementations for the sake of simple description. Type2 C-RNTI may be used for semi-persistent scheduled unicast transmission (activation, reactivation, modification, retransmission, deactivation). It may be used for Type 2 UL transmission without grant.

Another example is a SPS C-RNTI. The SPS C-RNTI may be used for semi-persistent scheduled unicast transmission (activation, reactivation, retransmission, and/or deactivation). Here, the SPS C-RNTI herein may be assumed to be included in a RNTI "D" in some implementations for the sake of simple description. SPS C-RNTI may be a Type1 C-RNTI, a Type2 C-RNTI, or a different type of C-RNTI.

Yet another example is a URLLC C-RNTI. Here, the URLLC C-RNTI herein may be assumed to be included in a RNTI "E" in some implementations for the sake of simple description. For URLLC, the UE may reuse C-RNTI, Type1 C-RNTI, Type2 C-RNTI and SPS C-RNTI, which means no specific C-RNTI is issued for URLLC. In a different design, a URLLC-specific identification called URLLC C-RNTI (the specification may use a different name, here URLLC C-RNTI is used as an example) may be used for URLLC related transmission. URLLC C-RNTI may be used for dynamic scheduled transmission. Also, URLLC C-RNTI may be used for semi-persistent scheduled URLLC transmission (activation, reactivation, retransmission, deactivation). Also, URLLC C-RNTI may be used for dynamic reconfiguration and/or parameter modification (L1 modification) of UL grant-free URLLC transmission.

The UE may monitor one or more search spaces. The search space may be treated as a set of PDCCH candidates. A search space may correspond to a special control resource set (e.g., time/frequency/spatial resource(s)). The term "monitor" means that the UE attempts to decode each DL control channel(s) in the set of candidates of the DL control channel(s) in accordance with all the DCI format(s) to be monitored.

Examples of search spaces that may be utilized in accordance with the systems and methods disclosed herein are given as follows. One example is the common search space (CSS). In one approach, the UE may monitor DCI format with Type1 C-RNTI in CSS. In another approach, the UE may monitor DCI format with Type2 C-RNTI in CSS. In another approach, the UE may monitor DCI format with SPS C-RNTI in CSS. In yet another approach, the UE may monitor DCI format with URLLC C-RNTI in CSS.

Another example of a search space that the UE may monitor is the UE-specific search space (USS). In an approach, the UE may monitor DCI format with Type1 C-RNTI in USS which is determined/used by C-RNTI. In another approach, the UE may monitor DCI format with Type2 C-RNTI in USS which is determined/used by C-RNTI. In another approach, the UE may monitor DCI format with SPS C-RNTI in USS which is determined/used by C-RNTI. In another approach, the UE may monitor DCI format with URLLC C-RNTI in USS which is determined/used by C-RNTI. In another approach, the UE may monitor DCI format with Type2 C-RNTI (SPS C-RNTI, or URLLC C-RNTI) in USS which is determined/used by Type1 C-RNTI. In another approach, the UE may monitor DCI format with Type1 C-RNTI (SPS C-RNTI, or URLLC C-RNTI) in USS which is determined/used by Type2 C-RNTI. In yet another approach, the UE may monitor DCI format with Type1 C-RNTI (Type2 C-RNTI, or URLLC C-RNTI) in USS which is determined/used by SPS C-RNTI.

Another example of a search space that the UE may monitor is URLLC search space. The URLLC may have a specific search space, which is named as URLLC search space as an example (the specification may use a different name). The UE can obtain URLLC related information by searching the URLLC search space. The URLLC search space may be determined, allocated and/or given for a URLLC C-RNTI, or a different C-RNTI. In an approach, the UE may monitor DCI format with Type1 C-RNTI in URLLC search space. In another approach, the UE may monitor DCI format with Type2 C-RNTI in URLLC search space. In another approach, the UE may monitor DCI format with SPS C-RNTI in URLLC search space. In yet another approach, the UE may monitor DCI format with URLLC C-RNTI in URLLC search space.

In another example of search spaces that the UE may monitor, the UE may monitor any combination of the above search spaces. For example, the UE may monitor a combination of the CSS, USS and/or URLLC search space.

The redundancy versions of repetitions are also described herein. For an UL transmission scheme with or without grant, K repetitions including initial transmission (K>=1) for the same transport block are supported. Redundancy version (RV) of each repetition should be clarified. A redundancy version may correspond to a start position at a (circular) buffer storing the coded bits. A redundancy version may be indexed by a number, e.g., 0, 1, 2, 3.

The RV values for repetitions may be implemented in different approaches. In a first approach, RV value may have a single value. All the repetitions of the same TB may use the same redundancy version. The value can be 0, 1, 2 or 3. This specific RV should be self-decodable.

In another approach, the RV value may be based on an RV pattern. The repetitions of the same TB may use different redundancy versions by following a specific pattern. A RV pattern may be treated as a sequence of RV values, which are mapped to the consecutive repetitions. For example, RV pattern {0, 3} means Repetition 0 (initial transmission) uses RV 0 and Repetition 1 uses RV 3.

How the RV value or RV pattern is indicated may be implemented in different approaches. In a first approach, the RV value/pattern may be fixed. For example, the RV value or pattern may be fixed by specification. In another approach, the RV value/pattern may be RRC configured. For example, the RV value or pattern may be configured by RRC. In another approach, the RV value/pattern may be indicated by L1 signaling. For example, the RV value or pattern may be indicated by L1 signaling (PDCCH, UL grant). In yet another approach, the RV value/pattern may be indicated by MAC CE.

A switch or adjustment between a single RV and an RV pattern is also described herein. In an approach, the switch/adjustment between a single RV and an RV pattern may be configurable. For example, there may be a parameter RVEnabler in RRC configuration. If RVEnabler is configured as true, different RVs will be applied to repetitions by following the RV pattern. If RVEnabler is configured as false, a single RV will be used for repetitions.

In yet another example, a single RV can be treated as a special case of an RV pattern. The UE can always know whether a single RV or different RVs will be used according to the indicated pattern.

In another approach, the switch/adjustment between a single RV and an RV pattern may be a conditioned adjustment. Whether to use a single RV or different RVs may depend on some conditions/thresholds. For example, if TB size is larger than a predefined/indicated/configured number TBThreshold, different RVs (a RV pattern) may be applied among repetitions for the same TB, otherwise, a single RV will be applied. In yet another design, if TB size is less than a predefined, indicated and/or configured number TBThreshold, different RVs (a RV pattern) may be applied among repetitions for the same TB, otherwise, a single RV will be applied.

In yet another example, if the number of repetitions is larger than a predefined, indicated and/or configured number KThreshold, different RVs (a RV pattern) may be applied among repetitions for the same TB, otherwise, a single RV may be applied. In yet another design, if the number of repetitions is less than a predefined, indicated and/or configured number KThreshold, different RVs (a RV pattern) may be applied among repetitions for the same TB, otherwise, a single RV may be applied.

In yet another example, if MCS index is larger than a predefined, indicated and/or configured number MCSThreshold, different RVs (a RV pattern) may be applied among repetitions for the same TB, otherwise, a single RV may be applied. In yet another design, if the MCS index is less than a predefined, indicated and/or configured number MCSThreshold, different RVs (a RV pattern) may be applied among repetitions for the same TB, otherwise, a single RV may be applied.

It should be noted that the predefined, indicated and/or configured parameter(s) above may be configured by RRC, or indicated by MAC CE or L1 signaling (e.g., PDCCH).

Switch/adjustment between/among two or more RV patterns may also be supported. Similar configurable or conditioned switch/adjustment as above may be used. For example, if a corresponding parameter (e.g., TB size, number of repetition K, MCS index) is larger than (or equal to) a predefined, indicated and/or configured number/threshold (e.g., TBThreshold, KThreshold, MCSThreshold), RV pattern A may be applied. If a corresponding parameter (e.g., TB size, number of repetition K, MCS index) is smaller than (or equal to) a predefined, indicated and/or configured number/threshold (e.g., TBThreshold, KThreshold, MCSThreshold), RV pattern B may be applied. It should be noted that the predefined, indicated and/or configured parameter(s) (including TBThreshold, KThreshold, MCSThreshold, RV pattern A, RV pattern B) above may be configured by RRC, or indicated by MAC CE or L1 signaling (e.g., PDCCH).

Limited buffer rate matching in relation to the redundancy versions is also described. Due to considerations of complexity, processing delay or UE capability, limited buffer rate matching (LBRM) or full buffer rate matching (FBRM, which may be also referred as non-limited buffer rate matching, NLBRM) may be used for circular buffer to store coded bits and to produce redundancy version(s). Whether to use limited buffer or not may be configurable or adjustable.

In an example of configurable limited buffer, there may be a parameter LBRMEnabler in RRC configuration. If LBRMEnabler is configured as true, LBRM may be applied. If LBRMEnabler is configured as false, full buffer rate matching may be used.

In yet another example, there may be a parameter FBRMEnabler in RRC configuration. If FBRMEnabler is configured as false, LBRM may be applied. If FBRMEnabler is configured as true, full buffer rate matching may be used.

In an example of conditioned adjustment for limited buffer, whether to use LBRM or FBRM may depend on some conditions/thresholds. For example, if TB size is larger than a predefined, indicated and/or configured number TBThresholdBuffer, LBRM may be applied, otherwise, FBRM will be applied. In yet another design, if TB size is less than a predefined, indicated and/or configured number TBThresholdbuffer, LBRM may be applied, otherwise, FBRM will be applied.

In yet another example, if the number of repetitions is larger than a predefined, indicated and/or configured number KThresholdBuffer, LBRM may be applied among repetitions for the same TB, otherwise, FBRM may be applied. In yet another design, if the number of repetitions is less than a predefined, indicated and/or configured number KThresholdBuffer, LBRM may be applied, otherwise, FBRM may be applied.

In yet another example, if MCS index is larger than a predefined, indicated and/or configured number MCSThresholdBuffer, LBRM may be applied among repetitions for the same TB, otherwise, FBRM may be applied. In yet another design, if the MCS index is less than a predefined, indicated and/or configured number MCSThresholdBuffer, LBRM may be applied, otherwise, FBRM may be applied.

It should be noted that the predefined, indicated and/or configured parameter(s) above may be configured by RRC, or indicated by MAC CE or L1 signaling (e.g., PDCCH).

Some approaches for hybrid automatic repeat request (HARQ) processes are described as follows. HARQ processes coexistence is one aspect of HARQ processes. In some approaches, a GF transmission may share HARQ processes with grant-based (GB) transmission. For example, a same HARQ process may be used by either GF transmission or GB transmission. Here, the GB transmission may be referred to as a dynamic scheduled transmission for a different service. It should be noted that a GB retransmission may be supported for a GF transmission of the same TB. In this case, the GB retransmission may use the same HARQ process of the GF transmission.

In some approaches, GF transmission may use dedicated HARQ processes. For example, a GF transmission may have its own HARQ processes, which are separated from other services or transmissions.

In some approaches, different types of GF transmissions may share HARQ process(es). For example, a same HARQ process may be used by different types of GF transmissions.

In some approaches, different types of GF transmissions may use dedicated HARQ process(es) separately. Each type of GF transmission (or configuration) may have its own HARQ processes, which are separated from other services, transmissions or configurations.

HARQ process number (e.g., HARQ process ID, HPN) of a GF transmission is another aspect of HARQ processes. In some approaches, the HPN may be derived from resource. For example, HPN may be derived from a time index, frequency resource or reference signal used by the GF transmission.

In some approaches, the HPN may be configured by RRC. In some approaches, the HPN may be indicated by L1 signaling or MAC CE. For example, the HPN may be indicated by L1 (PDCCH) activation for Type 2 transmission or SPS transmission.

Other parameters configuration for multiple types of GF transmissions are described herein. Some parameters may be configured independently or commonly for multiple types of GF transmissions or multiple configurations. A gNB may configure whether some parameters are configured independently or commonly.

In some approaches, different types of GF transmissions may share the same parameter configuration. For example, ULGFSkip may be used to indicate whether the UE can skip the UL transmission when there is no data. If configured, the UE may skip UL transmissions (e.g., Type 1, Type 2, SPS) for a configured uplink grant if no data is available for transmission in the UE buffer. If configured, it is applied to all the GF transmissions (e.g., Type 1, Type 2, SPS).

In another example, RepetitionEnabler may be used to indicate whether repetitions are supported or not for GF transmissions. If configured, repetitions may be enabled for UL transmissions (e.g., Type 1, Type 2, SPS). If configured, it is applied to all the GF transmissions (e.g., Type 1, Type 2, SPS).

In another example, if the parameter AckTimer is configured, the UE may flush the buffer in a case that no UL grant for the same TB is not received within AckTimer TTIs (e.g., subframes, slots, mini-slots, OFDM symbols) after the corresponding UL transmission. If configured, it is applied to all the GF transmissions (Type 1, Type 2, SPS).

In other examples, if a parameter earlyACK is configured by using the RRC signaling, the UE may terminate the repetitions when ACK is received (e.g., ACK is received even though the number of repetitions for that TB may not reach indicated number of repetitions K). If the parameter AckULgrant is configured by using the RRC signaling, the UE may always assume (consider, interpret, treat) the UL grant as ACK for the PUSCH transmission (e.g., a previous transmission, a corresponding PUSCH transmission). If the parameter NackULgrant is configured by using RRC signaling, the UE may always assume (consider, interpret, treat) the UL grant as NACK for the PUSCH transmission (e.g., a previous transmission, a corresponding PUSCH transmission). If the parameter NackULgrant is configured by using RRC signaling, the UE may always assume (consider, interpret, treat) the UL grant as ACK and/or NACK for the PUSCH transmission (e.g., a previous transmission, a corresponding PUSCH transmission). If these parameters above (including RV value/pattern, the number of repetition K, reference signal, RVEnabler and other parameters for RV value/pattern switching/adjustment and/or LBRM/FBRM) are configured, they may applied to all the GF transmissions (e.g., Type 1, Type 2, SPS).

In some approaches, different types of GF transmissions may use separate parameter configurations. The parameters above may be configured separately by different types of GF transmissions (e.g., Type 1, Type 2, SPS).

In some approaches, different configurations of the same type UL transmission may use same parameter configuration. For the same type of UL transmission, there may be multiple configurations. If the parameters above are configured, they may be applied to all the configurations of the same type UL transmission.

In some approaches, different configurations of the same type UL transmission may use separate parameter configurations. For the same type of UL transmission, there may be multiple configurations. The parameters above may be configured separately for the different configurations of the same type UL transmission.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for grant-free (GF) uplink transmission operations may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE grant-free (GF) transmission module 126.

In new radio (NR), multiple types of uplink transmissions without grant (which may also be referred to as grant-free (GF) uplink transmission or GF transmission) may be supported. For Type 1, UL data transmission without grant is only based on RRC (re)configuration without any Layer 1 (L1) signaling. The RRC (re-)configuration includes periodicity and offset of a resource with respect to SFN=0, time domain resource allocation, frequency domain resource allocation, UE-specific DMRS configuration, an MCS/TBS value, number of repetitions K, power control related parameters, may also include HARQ related parameters (e.g., number of HARQ processes). An example is shown in Listing-1.

Listing-1

```
-- ASN1START
Type1-Config ::= SEQUENCE {
    Type1C-RNTI              C-RNTI (or URLLC-RNTI)
        OPTIONAL,                -- Need OR
    Type1-ConfigUL           Type1-ConfigUL
```

Listing-1

```
        OPTIONAL                        -- Need ON
}
Type1-ConfigUL ::= CHOICE {
    release                     NULL,
    setup                       SEQUENCE {
        Type1Interval           ENUMERATED {-- Period of UL Type1
                                            slot1, slot2, slot4, slot8, slot10,
                                            slot20, slot32, slot40, slot64,
                                            slot80, slot128, slot160, slot320,
                                            slot640},
        numberOfRepetition ENUMERATED {-- Number of UL Repetitions
                                            1, 2, 4, 8},
        numberOfConfType1-Processes         INTEGER (1..8),
        RVPattern                   ENUMERATED {p1, p2, p3, p4},
        ResourceBlockAssingment             RBIndex,
        TimeOffeset                         TimeValue,
        Mini-slotPoisition                  Bitmap (or start postion and length),
        MCS                                 MCSValue,
        implicitReleaseAfter (or Type1-Timer) ENUMERATED {e2, e3, e4, e8},
        p0-Type1                    SEQUENCE {
            p0-NominalPUSCH-Type1           INTEGER (-126..24),
            p0-UE-PUSCH-Type1               INTEGER (-8..7)
        } OPTIONAL,                 -- Need OP
N1PUCCH-AN-PersistentList ::=               SEQUENCE (SIZE (1..4)) OF INTEGER
(0..2047)
-- ASN1STOP
```

To better serve the UL GF service/transmission (e.g., URLLC), some modifications or enhancements may be applied to Type 1 GF transmission. A specific RNTI (e.g., Type1C-RNTI in Listing-1) may be used to differentiate the Type 1 resource or transmission from other services/transmissions.

Also, the period of Type 1 GF UL transmission (e.g., Type1 Interval in Listing-1) may be short enough (e.g., slot1, slot2, slot4) to meet the latency requirement. In NR, time granularity may be subframe based, slot based, mini-slot based, OFDM symbol (OS) based. In Listing-1, a slot is used as an example. In general, the time resource of Type 1 may be determined by TTI index at starting time, period, TTI offset. All the parameters related to time domain resource may be configured by RRC. In a case that mini-slot is used, the mini-slot location (mini-slot/OS index/offset, length or bitmap) in a configured slot may be semi-statically configured in addition to the slot-based time domain resource configuration. The mini-slot location information may be configured by RRC.

The frequency resource of Type 1 GF UL transmission may be configured by RRC. Also, the number of UL URLLC repetitions (e.g., numberOfRepetition in Listing-1, also referred as repetition number) may be semi-statically configured for Type 1. The repetition number may be configured by RRC.

Also, the redundancy version (RV) of repetitions (e.g., RVPattern in Listing-1, also referred as RV pattern) or a RV value may be semi-statically configured for Type 1. The RV pattern or RV value may be configured by RRC.

Also, the number of HARQ processes (e.g., numberOfConfType1-Processes in Listing-1) may be configured for Type 1. The HARQ Process ID (also referred as HARQ Process Number (HPN)) of a URLLC UL transmission at the configured URLLC resource may be determined by the TTI index, number of repetitions, number of HARQ processes. For example, the HARQ Process ID associated with this TTI may be derived from the following equation:

$$\text{HARQ Process ID} = \text{floor}\{[\text{floor}(CURRENT\_TTI/Type1Interval)]/numberOfRepetition\} \text{ modulo } numberOfConfType1\text{-}Processes,$$

where CURRENT_TTI is the TTI index.

The number of HARQ processes may not be used if Type 1 is aligned with synchronous UL HARQ.

In a specific design, only one HARQ process is used for Type 1. The number of HARQ processes may not be used. On the other hand, a specific HARQ Process ID may be allocated to this Type1 configuration by RRC.

For Type 2 GF transmission, UL data transmission without grant is based on both RRC configuration and L1 signaling for activation/deactivation for UL data transmission without grant. The RRC (re-) configuration for resource and parameters includes periodicity of a resource, power control related parameters, and may include HARQ related parameters (e.g., number of HARQ processes). L1 signaling indicates other related parameters for the resource, such as offset associated with the periodicity with respect to a timing reference indicated by L1 signaling for activation, time domain resource allocation, frequency domain resource allocation, UE-specific DMRS configuration, an MCS/TBS value. Number of repetitions K may be configured by RRC signaling and/or indicated by L1 signaling. An example is shown in Listing-2.

Listing-2

```
-- ASN1START
Type2-Config ::= SEQUENCE {
    Type2C-RNTI         C-RNTI (or URLLC-RNTI)
                        OPTIONAL, -- Need OR
    Type2-ConfigUL      Type2-ConfigUL
```

Listing-2

```
                      OPTIONAL    -- Need ON
}
Type2-ConfigUL ::= CHOICE {
    release                     NULL,
    setup                       SEQUENCE {
        Type2Interval       ENUMERATED {-- Period of UL Type2
                                        slot1, slot2, slot4, slot8, slot10,
                                        slot20, slot32, slot40, slot64,
                                        slot80, slot128, slot160, slot320,
                                        slot640},
        numberOfRepetition  ENUMERATED{-- Number of UL Repetitions
                                        1, 2, 4, 8},
        numberOfConfType2-Processes        INTEGER (1..8),
        RVPattern                   ENUMERATED {p1, p2, p3, p4},
        implicitReleaseAfter (or Type2-Timer) ENUMERATED {e2, e3, e4, e8},
        p0-Type2                SEQUENCE {
            p0-NominalPUSCH-Type2    INTEGER (-126..24),
            p0-UE-PUSCH-Type2        INTEGER (-8..7)
        }                   OPTIONAL,  -- Need OP
N1PUCCH-AN-PersistentList ::=     SEQUENCE (SIZE (1..4)) OF INTEGER
(0..2047)
-- ASN1STOP
```

To better serve the UL GF service/transmission (e.g., URLLC), some modifications or enhancements may be applied to Type 2. A specific RNTI (e.g., Type2C-RNTI in Listing-2) may be used to differentiate the Type 2 resource or transmission from other services/transmissions.

Also, the period of Type 2 (e.g., Type2Interval in Listing-2) may be short enough (e.g., slot1, slot2, slot4) to meet the latency requirement. In NR, time granularity may be subframe based, slot based, mini-slot based, OFDM symbol (OS) based. In Listing-2, slot is used as an example. In general, the time resource of Type 2 GF transmission may be determined by TTI index at starting time, period, TTI offset. All the parameters related to time domain resource may be configured by RRC. Or, parts of the parameters (e.g., period) may be configured by RRC and remaining parameters (e.g., TTI index/offset) may be indicated by DCI for (re-)activation or dynamic scheduling. In a case that mini-slot is used, the mini-slot location (mini-slot/OS index/offset, length or bitmap) in a configured slot may be semi-statically configured in addition to the slot-based time domain resource configuration. The mini-slot location information may be configured by RRC or indicated by DCI for (re-)activation or dynamic scheduling.

Also, the frequency resource of Type 2 may be configured by RRC or indicated by DCI for (re-)activation or dynamic scheduling.

Also, the number of repetitions (e.g., numberOfRepetition in Listing-2, also referred as repetition number) may be semi-statically configured for Type 2. The repetition number may be configured by RRC or indicated by DCI for (re) activation or dynamic scheduling. Or, the set of repetition numbers is configured by RRC and the exact choice of repetition number is indicated by DCI for (re-)activation or dynamic scheduling.

Also, the number of HARQ processes (e.g., numberOfConfType2-Processes in Listing-2) may be configured for Type 2. The HPN of a Type 2 GF UL transmission at the configured URLLC resource may be determined by the TTI index, number of repetitions, number of HARQ processes. For example, the HARQ Process ID associated with this TTI may be derived from the following equation:

HARQ Process ID=floor{[floor(CURRENT_TTI/ Type2Interval)]/numberOfRepetition} modulo numberOfConfType2-Processes, where CURRENT_TTI is the TTI index.

The number of HARQ processes may not be used if Type 2 is aligned with synchronous UL HARQ. In a specific design, only one HARQ process is used for Type 2. The number of HARQ processes may not be used. On the other hand, a specific HARQ Process ID may be allocated to this Type 2 configuration by RRC. Or, a specific HARQ Process ID may be allocated to this Type 2 and may be indicated by L1 signaling (e.g., PDCCH activation/reactivation/modification). For example, the HPN field in DCI can be used for HPN indication in L1 signaling.

Also, the redundancy version (RV) of repetitions (e.g., RVPattern in Listing-2, also referred as RV pattern) or a RV value may be semi-statically configured for Type 2 or dynamically adjusted. The RV pattern or RV value may be configured by RRC or indicated by L1 signaling (e.g., PDCCH activation/reactivation/modification). For example, the RV field in DCI can be used for RV or RV pattern indication in L1 signaling.

For semi-static resource allocation (also referred to as semi-persistent scheduling, SPS), there may be several basic procedures: radio resource control (RRC) configuration (e.g., a RRC message, a RRC signal), activation, UL transmission and deactivation. The RRC configuration may be exchanged between the gNB/eNB 160 and the UE 102 through an RRC layer. And, the RRC signal may be included in a higher layer signal.

Some of the parameters (e.g., periodicity, address, allocation, and MCS to be used in the SPS resources) may need to be configured for semi-persistent scheduling. Part of these parameters (e.g., periodicity, address) may be configured semi-statically (SPS Configuration), and the rest may be configured with PDCCH (SPS Activation). For example, the gNB/eNB 160 may configure a periodicity (e.g., a time resource) by using the RRC signal, and indicate SPS resource (e.g., a frequency resource) by using DCI format for activation. After UL SPS is configured and activated, the UE 102 has sufficient information of the location of the configured UL grant-free resources are reserved for fast uplink access. Then, the UE 102 may start UL transmission.

In Release 8, the UE 102 keeps transmitting at the configured resources until UL SPS is deactivated explicitly and implicitly. In Release 14, the UE 102 may transmit as needed and skip the configured resources when there is no transport block (TB) for transmission. For example, at the beginning, the eNB/gNB 160 should allocate SPS resource (e.g., periodicity of SPS resource) and function to a specific UE 102 by SPS-Config, which is shown in the SPS-Config information element of Listing-3. Here, for example, the eNB/gNB 160 may configure a periodicity (e.g., a time resource) by using the RRC signal, and indicate SPS resource (e.g., a frequency resource) by using DCI format.

| Listing-3 |
|---|
| ```
-- ASN1START
SPS-Config ::= SEQUENCE {
    semiPersistSchedC-RNTI          C-RNTI          OPTIONAL,   -- Need OR
    sps-ConfigDL                    SPS-ConfigDL    OPTIONAL,   -- Need ON
    sps-ConfigUL                    SPS-ConfigUL    OPTIONAL    -- Need ON
}
SPS-ConfigDL ::= CHOICE{
    release                         NULL,
    setup                           SEQUENCE {
        semiPersistSchedIntervalDL              ENUMERATED {
                                                sf10, sf20, sf32, sf40, sf64, sf80,
                                                sf128, sf160, sf320, sf640, spare6,
                                                spare5, spare4, spare3, spare2,
                                                spare1},
        numberOfConfSPS-Processes               INTEGER (1..8),
        n1PUCCH-AN-PersistentList               N1PUCCH-AN-PersistentList,
        ...,
        [[ twoAntennaPortActivated-r10          CHOICE {
                release                         NULL,
                setup                           SEQUENCE {
                    n1PUCCH-AN-PersistentListP1-r10     N1PUCCH-AN-
PersistentList
                }
        }                   OPTIONAL        -- Need ON
        ]]
    }
}
SPS-ConfigUL ::= CHOICE {
    release                         NULL,
    setup                           SEQUENCE {
        semiPersistSchedIntervalUL              ENUMERATED {-- Period of UL SPS
                                                sf10, sf20, sf32, sf40, sf64, sf80,
                                                sf128, sf160, sf320, sf640, sf1-v14xy,
                                                sf2-v14xy, sf3-v14xy, sf4-v14xy,
                                                sf5-v14xy, spare1},
        implicitReleaseAfter                    ENUMERATED {e2, e3, e4, e8},
        p0-Persistent                           SEQUENCE {
            p0-NominalPUSCH-Persistent              INTEGER (-126..24),
            p0-UE-PUSCH-Persistent                  INTEGER (-8..7)
        }               OPTIONAL,       -- Need OP
        twoIntervalsConfig                      ENUMERATED {true}
OPTIONAL,   -- Cond TDD
        ...,
        [[ p0-PersistentSubframeSet2-r12        CHOICE {
                release                         NULL,
                setup                           SEQUENCE {
                    p0-NominalPUSCH-PersistentSubframeSet2-r12
INTEGER (-126..24),
                    p0-UE-PUSCH-PersistentSubframeSet2-r12
INTEGER (-8..7)
                }
        }                   OPTIONAL        -- Need ON
        ]],
        [[ numberOfConfUlSPS-Processes-r13              INTEGER (1..8)
OPTIONAL        -- Need OR
        ]]
    }
}
N1PUCCH-AN-PersistentList ::=           SEQUENCE (SIZE (1..4)) OF INTEGER
(0..2047)
-- ASN1STOP
``` |

In NR, the relationship between SPS and UL GF transmission may include the following possibilities: SPS is a totally different type; SPS is equivalent to Type 1. The specification may use SPS instead of Type 1, or may use Type 1 instead of SPS; SPS may be equivalent to Type 2. The specification may use SPS instead of Type 2, or use Type 2 instead of SPS; Type 1 may be a special case of SPS; Type 2 may be a special case of SPS; SPS may be a special case of Type 1. SPS may be a configuration of Type 1 corresponding to a specific service; SPS may be a special case of Type 2. SPS may be a configuration of Type 2 corresponding to a specific service.

In addition to a configured grant-free resource (e.g., Type 1, Type 2, SPS), the gNB/eNB 160 may send DCI indicating Dynamic Scheduling resource (also referred to as DS resource or grant-based resource). Here, the DS resource may include (correspond to) UL resource, a frequency resource, UL-SCH resource, and/or PUSCH resource. The DS resource may use a different resource compared to the configured resource for GF transmission(s). Or, the DS resource may override the configured resource for GF transmission(s). Or, the DS resource may use the same resource as the configured resource for GF transmission(s). Or, the DS resource may be preempted by GF transmission (e.g., puncturing, superposition). Time/frequency resource may be included in the DCI format.

A UE 102 may be configured with multiple GF resources (e.g., multiple periodicities, multiple TTI offsets, multiple frequency resources, multiple reference signals).

To differentiate service/transmission types, different Radio Network Temporary Identifiers (RNTIs) may be allocated to a UE 102. RNTI is used to scramble the CRC part of the radio channel messages. It implies that if the UE 102 does not know the exact RNTI values for each of the cases, it cannot decode the radio channel messages. For example, Cell RNTI (C-RNTI) is used for dynamic scheduled unicast transmission.

Type1 C-RNTI is used for dynamic scheduled unicast (re)transmission. It may be used for Type 1 UL transmission without grant.

Type2 C-RNTI is used for semi-persistent scheduled unicast transmission (activation, reactivation, modification, retransmission, deactivation). It may be used for Type 2 UL transmission without grant.

SPS C-RNTI is used for semi-persistent scheduled unicast transmission (activation, reactivation, retransmission, deactivation, modification). SPS C-RNTI may be a Type1 C-RNTI, a Type2 C-RNTI, or a different type of C-RNTI. For URLLC, the UE 102 may reuse C-RNTI, Type1 C-RNTI, Type2 C-RNTI and SPS C-RNTI, which means no specific C-RNTI is issued for URLLC. In a different design, a URLLC-specific identification called URLLC C-RNTI (the specification may use a different name, here URLLC C-RNTI is used as an example) may be used for URLLC related transmission. URLLC C-RNTI may be used for dynamic scheduled transmission. Also, URLLC C-RNTI may be used for semi-persistent scheduled URLLC transmission (activation, reactivation, retransmission, deactivation, modification). Also, URLLC C-RNTI may be used for dynamic reconfiguration/modification of UL grant-free URLLC transmission.

A URLLC UE 102 may monitor several search spaces: common search space (CSS), UE-specific search space (USS), URLLC search space. The search space can be treated as a set of PDCCH candidates. A search space may correspond to a special control resource set (e.g., time/frequency/spatial resource(s)).

The UE 102 may monitor DCI format with Type1 C-RNTI in CSS. The UE 102 may monitor DCI format with Type2 C-RNTI in CSS. The UE 102 may monitor DCI format with SPS C-RNTI in CSS. The UE 102 may monitor DCI format with URLLC C-RNTI in CSS.

The UE 102 may monitor DCI format with Type1 C-RNTI in USS which is determined/used by C-RNTI. The UE 102 may monitor DCI format with Type2 C-RNTI in USS which is determined/used by C-RNTI. The UE 102 may monitor DCI format with SPS C-RNTI in USS which is determined/used by C-RNTI. The UE 102 may monitor DCI format with URLLC C-RNTI in USS which is determined/used by C-RNTI. The UE 102 may monitor DCI format with Type2 C-RNTI (SPS C-RNTI, or URLLC C-RNTI) in USS which is determined/used by Type1 C-RNTI. The UE 102 may monitor DCI format with Type1 C-RNTI (SPS C-RNTI, or URLLC C-RNTI) in USS which is determined/used by Type2 C-RNTI. The UE 102 may monitor DCI format with Type1 C-RNTI (Type2 C-RNTI, or URLLC C-RNTI) in USS which is determined/used by SPS C-RNTI.

URLLC may have a specific search space, which is named as URLLC search space as an example (the specification may use a different name). The UE 102 can obtain URLLC related information by searching the URLLC search space. The URLLC search space may be determined/allocated/given for a URLLC C-RNTI, or a different C-RNTI. The UE 102 may monitor DCI format with Type1 C-RNTI in URLLC search space. The UE 102 may monitor DCI format with Type2 C-RNTI in URLLC search space. The UE 102 may monitor DCI format with SPS C-RNTI in URLLC search space. The UE 102 may monitor DCI format with URLLC C-RNTI in URLLC search space. Any combination of the above for DCI monitoring may be applied.

For an UL transmission scheme with or without grant, K repetitions including initial transmission (K>=1) for the same transport block are supported. Redundancy version (RV) of each repetition may be clarified. A redundancy version may correspond to a start position at a (circular) buffer storing the coded bits. A redundancy version may be indexed by a number, e.g., 0, 1, 2, 3.

A single value may be used for an RV indication of repetitions. All the repetitions of the same TB use the same redundancy version. The value can be 0, 1, 2 or 3. This specific RV should be self-decodable.

A RV pattern may be used for RV indication of repetitions. The repetitions of the same TB may use different redundancy versions by following a specific pattern. A RV pattern may be treated as a sequence of RV values, which are mapped to the consecutive repetitions. For example, RV pattern {0, 3} means Repetition 0 (initial transmission) uses RV 0 and Repetition 1 uses RV 3. The length of RV value sequence in a RV pattern may be the same as the number of repetitions. In yet another implementation, the length of RV value sequence in a RV pattern may be different from the number of repetitions. In this case, truncation and/or circular duplication may be used to produce the RV values sequence with the same length as the number of repetitions. For example, RV pattern is indicated as {0, 3, 2, 1}. If the number of repetitions is indicated as 3, the RV values used by repetition 0 (initial transmission) and the following repetitions (repetition 1, repetition 2) are 0, 3, 2, respectively. If the number of repetitions is indicated as 6, the RV values used by repetition 0 (initial transmission) and the following repetitions (repetition 1, repetition 2, repetition 3, repetition 4, repetition 5) are 0, 3, 2, 1, 0, 3, respectively.

The RV value or pattern may be fixed by specification. The RV value or pattern may be configured by RRC (e.g., RVPattern in Listing-1 and Listing-2). The RV value or pattern may be indicated by L1 signaling (UL grant, PDCCH, e.g., the RV field in DCI can be reused in L1 activation/reactivation/modification for Type 2 or SPS) or indicated by MAC CE.

A switch/adjustment between single RV value and an RV pattern may be supported for GF transmission. Switch/adjustment between single RV value and RV pattern may be configurable. For example, there may be a parameter RVEnabler in RRC configuration. If RVEnabler is configured as true, different RVs will be applied to repetitions by following the RV pattern. If RVEnabler is configured as false, a single RV will be used for repetitions. In yet another example, single RV can be treated as a special case of RV pattern. The UE 102 can always know whether a single RV or different RVs will be used according to the indicated pattern.

A single RV value and RV pattern may be conditioned adjusted. Whether to use a single RV value or different RVs may depend on some conditions/thresholds. For example, if TB size is larger than a predefined/indicated/configured number TBThreshold, different RVs (a RV pattern) may be applied among repetitions for the same TB, otherwise, a single RV may be applied. In yet another design, if TB size is less than a predefined/indicated/configured number TBThreshold, different RVs (a RV pattern) may be applied among repetitions for the same TB, otherwise, a single RV may be applied.

In yet another example, if the number of repetitions is larger than a predefined/indicated/configured number KThreshold, different RVs (a RV pattern) may be applied among repetitions for the same TB, otherwise, a single RV may be applied. In yet another design, if the number of repetitions is less than a predefined/indicated/configured number KThreshold, different RVs (a RV pattern) may be applied among repetitions for the same TB, otherwise, a single RV may be applied.

In yet another example, if MCS index is larger than a predefined/indicated/configured number MCSThreshold, different RVs (a RV pattern) may be applied among repetitions for the same TB, otherwise, a single RV may be applied. In yet another design, if the MCS index is less than a predefined/indicated/configured number MCSThreshold, different RVs (a RV pattern) may be applied among repetitions for the same TB, otherwise, a single RV may be applied. The predefined/indicated/configured parameter(s) above may be configured by RRC, or indicated by MAC CE or L1 signaling (e.g., PDCCH).

Due to considerations of complexity, processing delay or UE capability, limited buffer rate matching (LBRM) or full buffer rate matching (FBRM) may be used for a circular buffer to store coded bits and to produce redundancy version(s). Whether to use limited buffer or not may be configurable or adjustable. For example, there may be a parameter LBRMEnabler in RRC configuration. If LBRMEnabler is configured as true, LBRM will be applied. If LBRMEnabler is configured as false, full buffer rate matching will be used. In yet another example, there may be a parameter FBRMEnabler in RRC configuration. If FBRMEnabler is configured as false, LBRM will be applied. If FBRMEnabler is configured as true, full buffer rate matching will be used.

Whether to use LBRM or FBRM may depend on some conditions/thresholds. For example, if TB size is larger than a predefined/indicated/configured number TBThresholdBuffer, LBRM will be applied, otherwise, FBRM will be applied. In yet another design, if TB size is less than a predefined/indicated/configured number TBThresholdBuffer, LBRM will be applied, otherwise, FBRM will be applied. In yet another example, if the number of repetitions is larger than a predefined/indicated/configured number KThresholdBuffer, LBRM will be applied among repetitions for the same TB, otherwise, FBRM will be applied. In yet another design, if the number of repetitions is less than a predefined/indicated/configured number KThresholdBuffer, LBRM will be applied, otherwise, FBRM will be applied. In yet another example, if MCS index is larger than a predefined/indicated/configured number MCSThresholdBuffer, LBRM will be applied among repetitions for the same TB, otherwise, FBRM will be applied. In yet another design, if the MCS index is less than a predefined/indicated/configured number MCSThresholdBuffer, LBRM will be applied, otherwise, FBRM will be applied. The predefined/indicated/configured parameter(s) above may be configured by RRC, or indicated by MAC CE or L1 signaling (e.g., PDCCH).

In an approach GF transmission may share HARQ processes with grant-based (GB) transmission. A same HARQ process may be used by either GF transmission or GB transmission.

In an approach, GF transmission may use dedicated HARQ processes. In this approach, a GF transmission has its own HARQ processes, which are separated from other services or transmissions.

In an approach, different types of GF transmissions share HARQ process(es). A same HARQ process may be used by different types of GF transmissions.

In an approach, different types of GF transmissions use dedicated HARQ process(es) separately. Each type of GF transmission (or configuration) may have its own HARQ processes, which are separated from other services, transmissions or configurations.

The HARQ process number (HARQ process ID, HPN) of a GF transmission may be derived from a resource. HPN may be derived from time index, frequency resource or reference signal used by GF transmission. HPN may be configured by RRC, or indicated by L1 signaling or MAC CE. For example, HPN may be indicated by L1 (PDCCH) activation for Type 2 transmission or SPS transmission.

Some parameters may be configured independently or commonly for multiple types of GF transmissions or multiple configurations. For example, the gNB 160 may configure whether some parameters are configured independently or commonly.

For some parameters, different types of GF transmissions may share the same parameter configuration. For example, ULGFSkip may be used to indicate whether a UE 102 can skip the UL transmission when there is no data. If configured, the UE 102 skips UL transmissions (e.g., Type 1, Type 2, SPS) for a configured uplink grant if no data is available for transmission in the UE buffer. If configured, it is applied to all the GF transmissions (e.g., Type 1, Type 2, SPS). If the MAC PDU includes only the MAC CE for padding BSR or periodic BSR with zero MAC SDUs and there is no aperiodic CSI requested for this TTI, the MAC entity shall not generate a MAC PDU for the HARQ entity in case the MAC entity is configured with ULGFSkip and the grant indicated to the HARQ entity is a configured uplink grant.

The parameter RepetitionEnabler may be used to indicate whether repetitions are supported or not for GF transmissions. If RepetitionEnabler is configured, repetitions are enabled for UL transmissions (e.g., Type 1, Type 2, SPS). If RepetitionEnabler is configured, it is applied to all the GF transmissions (Type 1, Type 2, SPS).

If the parameter AckTimer is configured, the UE 102 may flush the buffer in a case that no UL grant for the same TB is not received within AckTimer TTIs (e.g., subframes, slots, mini-slots, OFDM symbols) after the corresponding UL transmission. If AckTimer is configured, it is applied to all the GF transmissions (e.g., Type 1, Type 2, SPS).

If a parameter earlyACK is configured by using the RRC signaling, the UE 102 may terminate the repetitions when ACK is received (e.g., ACK is received even though the number of repetitions for that TB may not reach indicated number of repetitions K). If the parameter AckULgrant is configured by using the RRC signaling, the UE 102 may always assume (consider, interpret, treat) the UL grant as ACK for the PUSCH transmission (e.g., a previous transmission, a corresponding PUSCH transmission). If the parameter NackULgrant is configured by using RRC signaling, the UE may always assume (consider, interpret, treat) the UL grant as NACK for the PUSCH transmission (e.g., a previous transmission, a corresponding PUSCH transmission). If the parameter NackULgrant is configured by using RRC signaling, the UE 102 may always assume (consider, interpret, treat) the UL grant as ACK and/or NACK for the PUSCH transmission (e.g., a previous transmission, a corresponding PUSCH transmission). If these parameters above (including RV value/pattern, RVEnabler and other parameters for RV value/pattern switching/adjustment and/or LBRM/FBRM) are configured, they may be applied to all the GF transmissions (e.g., Type 1, Type 2, SPS).

Different types of UL GF transmissions may use separate parameter configurations. The parameters above may be configured separately by different types of GF transmissions (e.g., Type 1, Type 2, SPS). An example is shown in Listing-4.

| Listing-4 |
|---|
| ```
-- ASN1START
ULGFSkip                   CHOICE {
    release                           NULL,
    setup                             SEQUENCE {
        skipUplinkTxSPS                   ENUMERATED {true}
            OPTIONAL,  -- Need OR
        skipUplinkTxType1                 ENUMERATED {true}
            OPTIONAL   -- Need OR
        skipUplinkTxType2                 ENUMERATED {true}
            OPTIONAL   -- Need OR
    }
}
AckTimer                   CHOICE {
    release                           NULL,
    setup                             SEQUENCE {
        AckTimerSPS                       ENUMERATED {e2, e3, e4, e8}
            OPTIONAL,  -- Need OR
        AckTimerType1                     ENUMERATED {e2, e3, e4, e8}
            OPTIONAL   -- Need OR
        AckTimerType2                     ENUMERATED {e2, e3, e4, e8}
            OPTIONAL   -- Need OR
    }
}
RepetitionEnabler          CHOICE {
    release                           NULL,
    setup                             SEQUENCE {
        RepetitionSPS                     ENUMERATED {true}
            OPTIONAL,  -- Need OR
        RepetitionType1                   ENUMERATED {true}
            OPTIONAL   -- Need OR
        RepetitionType2                   ENUMERATED {true}
            OPTIONAL   -- Need OR
    }
}
earlyACK                   CHOICE {
    release                           NULL,
    setup                             SEQUENCE {
        earlyACKSPS                       ENUMERATED {true}
            OPTIONAL   -- Need OR
        earlyACKType1                     ENUMERATED {true}
            OPTIONAL   -- Need OR
        earlyACKType2                     ENUMERATED {true}
            OPTIONAL   -- Need OR
    }
}
RVEnabler                  CHOICE {
    release                           NULL,
    setup                             SEQUENCE {
        RVSPS                             ENUMERATED {true}
            OPTIONAL,  -- Need OR
        RVType1                           ENUMERATED {true}
            OPTIONAL   -- Need OR
        RVType2                           ENUMERATED {true}
            OPTIONAL   -- Need OR
    }
}
-- ASN1STOP
``` |

Different configurations of the same type UL transmission may use the same parameter configuration. For the same type of UL transmission, there may be multiple configurations. If the parameters above are configured, they may be applied to all the configurations of the same type UL transmission.

Different configurations of the same type UL transmission may use separate parameter configuration. For the same type of UL transmission, there may be multiple configurations. The parameters above may be configured separately for the different configurations of the same type UL transmission.

A gNB 160 may configure whether some parameters are configured independently or commonly. An example is shown in Listing-5.

| Listing-5 |
|---|
| -- ASN1START |
| GF-Config ::=         CHOICE { |
|    release              NULL, |
|    setup                SEQUENCE { |
|      K                       ENUMERATED {independently} |
|          OPTIONAL,  -- Need OR |
|      ULGFSkip                ENUMERATED {Commonly} |
|          OPTIONAL   -- Need OR |
|      DMRS                    ENUMERATED {independently} |
|          OPTIONAL   -- Need OR |
|      AckTimer                ENUMERATED {independently} |
|          OPTIONAL   -- Need OR |
|      earlyACK                ENUMERATED {independently} |
|          OPTIONAL   -- Need OR |
|    } |
| } |
| -- ASN1STOP |

Namely, as described above, one or more types of UL data transmission may be defined (i.e., specified). For example, as described, the one or more types (e.g., the first types of GF transmission, the second types of GF transmission, and/or UL data transmission based on the semi-persistent scheduling) of UL data transmission may be defined. As described above, the one or more types of UL data transmission may be identified by using different configuration(s) and/or different indication(s) by the gNB 160. Also, as described above, for example, the one or more types of UL data transmission may be identified by using different RNTI(s). Here, the one or more types of UL data transmission herein may be assumed to be included in the one or more configurations in some implementations for the sake of simple description.

And, the one or more configurations for UL data transmission may be defined. For example, for the single type of GF transmission, the gNB 160 may transmit, e.g., by using the RRC message and/or the DCI format, a first parameter(s) used for configuring a first value(s) and a second parameter(s) used for configuring a second value(s). Here, the gNB 160 may configure, per serving cell (i.e., for each of the primary cell and the one or more secondary cell), the first parameter(s) (i.e., the first value(s)) and/or the second parameter(s) (i.e., the second value(s)).

Here, the first parameter(s) may include a parameter(s) as described above (e.g., a periodicity and/or offset value (i.e., the time resource), the frequency resource (e.g., the frequency resource allocation, the PRB index), the UE-specific DMRS configuration, the MCS/TBS value, the number of repetitions K, the power control related parameters, the HARQ related parameters (e.g., the number of the HARQ process), RNTI, ULGFSkip, RepetitionEnabler, AckTimer, earlyACK). Also, the second parameter(s) may include a parameter(s) as described above (e.g., the periodicity and/or the offset value (i.e., the time resource), the frequency resource (e.g., the frequency resource allocation, the PRB index), the UE-specific DMRS configuration, the MCS/TBS value, the number of repetitions K, the power control related parameters, the HARQ related parameters (e.g., the number of the HARQ process), RNTI, ULGFSkip, RepetitionEnabler, AckTimer, earlyACK).

For example, the gNB 160 may transmit, e.g., by using the RRC message and/or the DCI format, the first parameter(s) used for configuring a first periodicity and/or a first offset value (i.e., the first time resource(s)), and the second parameter(s) used for configuring a second periodicity and/or a second offset value (i.e., the second time resource(s)).

And, gNB 160 may transmit, e.g., by using the RRC message and/or the DCI format, a third parameter(s) used for configuring a third value(s). Here, as described above, the gNB 160 may independently configure the third parameter(s) for the one or more configurations for UL data transmission (i.e., for the first parameter(s) and the second parameter(s)). Also, the gNB 160 may commonly configure the third parameter(s) for the one or more configurations for UL data transmission (i.e., for the first parameter(s) and the second parameter(s)). Here, the third parameter(s) may include a parameter(s) as described above (e.g., a periodicity and/or offset value (i.e., the time resource), the frequency resource (e.g., the frequency resource allocation, the PRB index), the UE-specific DMRS configuration, the MCS/TBS value, the number of repetitions K, the power control related parameters, the HARQ related parameters (e.g., the number of the HARQ process), RNTI, ULGFSkip, RepetitionEnabler, AckTimer, earlyACK).

For example, as described above, the gNB 160 may configure (e.g., as the one or more configurations for UL data transmission), the first periodicity and the second periodicity. Also, the gNB 160 may independently configure (e.g., indicate) for the one or more configurations for UL data transmission, e.g., by using the RRC message and/or the DCI format, the third parameter(s) used for configuring (e.g., indicating) the frequency resource. Namely, the gNB 160 may configure for the first parameter(s), the third parameter(s) for indicating a fourth value(s) of the frequency resource. Also, the gNB 160 may configure for the second parameter(s), the third parameter(s) for indicating a fifth value(s) of the frequency resource. The UE 102 may perform, based on the first periodicity and the second periodicity, the UL data transmission (e.g., the same TB may be transmitted based on the first periodicity and the second periodicity, the same TB may be transmitted on the time resource based on the first periodicity and the time resource based on the second periodicity). And, in a case that the UL data transmission is performed based on the first periodicity, the UE 102 may use the frequency resource based on the fourth value(s) to perform the UL data transmission. Also, in a case that the UL data transmission is performed based on the second periodicity, the UE 102 may use the frequency resource based on the fifth value(s) to perform the UL data transmission.

Also, the gNB 160 may commonly configure (e.g., indicate) for one or more configurations for UL data transmission, e.g., by using the RRC message and/or the DCI format, the third parameter (s) used for configuring (e.g., indicating) the frequency resource. Namely, the gNB 160 may configure (e.g., indicate) for the first parameter(s) and the second parameter(s), the third parameter(s) for indicating a sixth value(s) of the frequency resource. The UE 102 may perform, based on the first periodicity and the second periodicity, the UL data transmission (e.g., the same TB may be transmitted based on the first periodicity and the second periodicity, the same TB may be transmitted on the time resource based on the first periodicity and the time resource based on the second periodicity). And, in a case that the UL data transmission is performed based on the first periodicity, the UE 102 may use the frequency resource based on the sixth value(s) to perform the UL data transmission. Also, in a case that the UL data transmission is performed based on the second periodicity, the UE 102 may use the frequency resource based on the sixth value(s) to perform the UL data transmission. Namely, the frequency resource based on the sixth value(s) may be commonly used for the first parameter(s) and the second parameter(s).

Here, the behavior of the UE in a case that the third parameter(s) is independently configured for the one or more configuration for UL data transmission (e.g., the first parameter(s) and the second parameter(s)) may be a behavior A. Also, the behavior of the UE in a case that the third parameter(s) is commonly configured for the one or more configuration for UL data transmission (e.g., the first parameter(s) and the second parameter(s)) may be a behavior B. Here, as described above, the gNB 160 may configure, e.g., by using the RRC message, whether the third parameter(s) is independently configured for the one or more configuration for UL data transmission or the third parameter(s) is commonly configured for the one or more configuration for UL data transmission. Namely, in a case that the UE 102 is configured so that the third parameter(s) is independently configured for the one or more configuration for UL data transmission (e.g., the UE 102 is configured with a configuration A), the UE 102 perform the behavior A. Also, in a case that the UE 102 is not configured so that the third parameter(s) is independently configured for the one or more configuration for UL data transmission (e.g., the UE 102 is not configured with a configuration A), the UE 102 perform the behavior B. Also, in a case that the UE 102 is configured so that the third parameter(s) is commonly configured for the one or more configuration for UL data transmission (e.g., the UE 102 is configured with a configuration B), the UE 102 perform the behavior B. Also, in a case that the UE 102 is not configured so that the third parameter(s) is commonly configured for the one or more configuration for UL data transmission (e.g., the UE 102 is not configured with a configuration B), the UE 102 perform the behavior A.

Here, one or more of the third parameter(s) as described may be independently configured for the one or more configurations for UL data transmission. Also, one or more of the third parameter(s) as described above may be commonly configured for the one or more configuration for UL data transmission. Namely, a first part of the third parameter(s) may be independently configured for the one or more confirmations for UL data transmission, and a second part of the third parameter(s) may be commonly configured for the one or more configuration for UL data transmission.

For example, the periodicity and/or the offset value may be independently configured for the one or more confirmations for UL data transmission. Also, the frequency resource may be independently configured for the one or more confirmations for UL data transmission. Also, the UE-specific DMRS configuration may be independently configured for the one or more confirmations for UL data transmission. Also, the MCS/TBS value may be independently configured for the one or more confirmations for UL data transmission. Also, the number of repetitions K may be independently configured for the one or more confirmations for UL data transmission. Also, the power control related parameters may be independently configured for the one or more confirmations for UL data transmission. Also, the HARQ related parameters (e.g., the number of the HARQ process) may be independently configured for the one or more confirmations for UL data transmission. Also, RNTI (e.g., C-RNTI) may be independently configured for the one or more confirmations for UL data transmission. Also, the parameter ULGFSkip may be independently configured for the one or more confirmations for UL data transmission. Also, the parameter RepetitionEnabler may be independently configured for the one or more confirmations for UL data transmission. Also, the parameter AckTimer may be independently configured for the one or more confirmations for UL data transmission. Also, the parameter earlyACK may be independently configured for the one or more confirmations for UL data transmission.

Also, the periodicity and/or the offset value may be commonly configured for the one or more confirmations for UL data transmission. Also, the frequency resource may be commonly configured for the one or more confirmations for UL data transmission. Also, the UE-specific DMRS configuration may be commonly configured for the one or more confirmations for UL data transmission. Also, the MCS/TBS value may be commonly configured for the one or more confirmations for UL data transmission. Also, the number of repetitions K may be commonly configured for the one or more confirmations for UL data transmission. Also, the power control related parameters may be commonly configured for the one or more confirmations for UL data transmission. Also, the HARQ related parameters (e.g., the number of the HARQ process) may be commonly configured for the one or more confirmations for UL data transmission. Also, RNTI (e.g., C-RNTI) may be commonly configured for the one or more confirmations for UL data transmission. Also, the parameter ULGFSkip may be commonly configured for the one or more confirmations for UL data transmission. Also, the parameter RepetitionEnabler may be commonly configured for the one or more confirmations for UL data transmission. Also, the parameter AckTimer may be commonly configured for the one or more confirmations for UL data transmission. Also, the parameter earlyACK may be commonly configured for the one or more confirmations for UL data transmission.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB GF transmission module 194. The gNB GF transmission module 194 may perform GF transmission operations as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
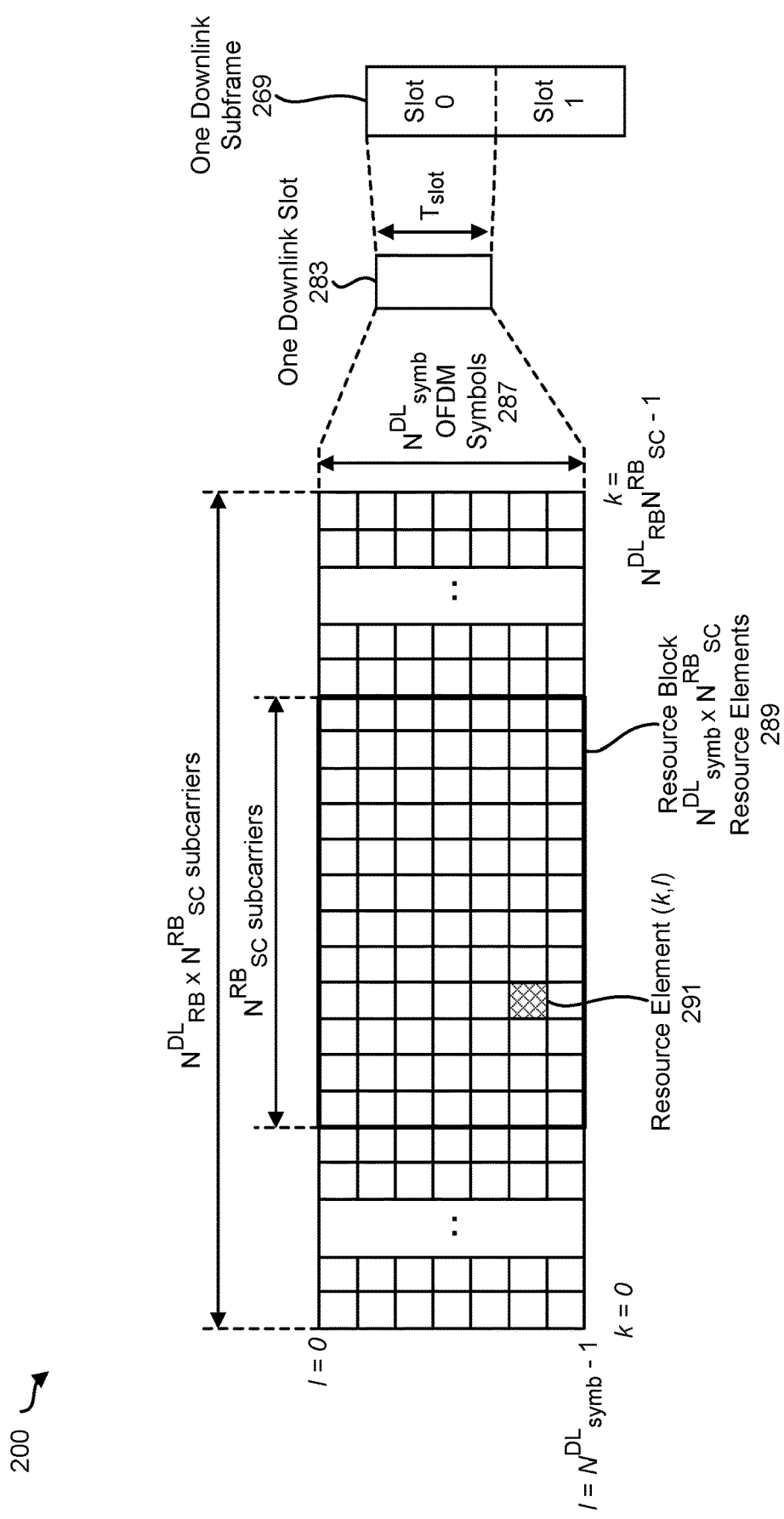
FIG. 2 is a diagram illustrating an example of a resource grid for the downlink.

FIG. 2 is a diagram illustrating an example of a resource grid 200 for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 291 may be the RE 291 whose index 1 fulfils $1 \geq 1_{data,start}$ and/or $1_{data,end} \geq 1$ in a subframe.

In the downlink, the OFDM access scheme with cyclic prefix (CP) may be employed, which may be also referred to as CP-OFDM. In the downlink, PDCCH, EPDCCH, PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
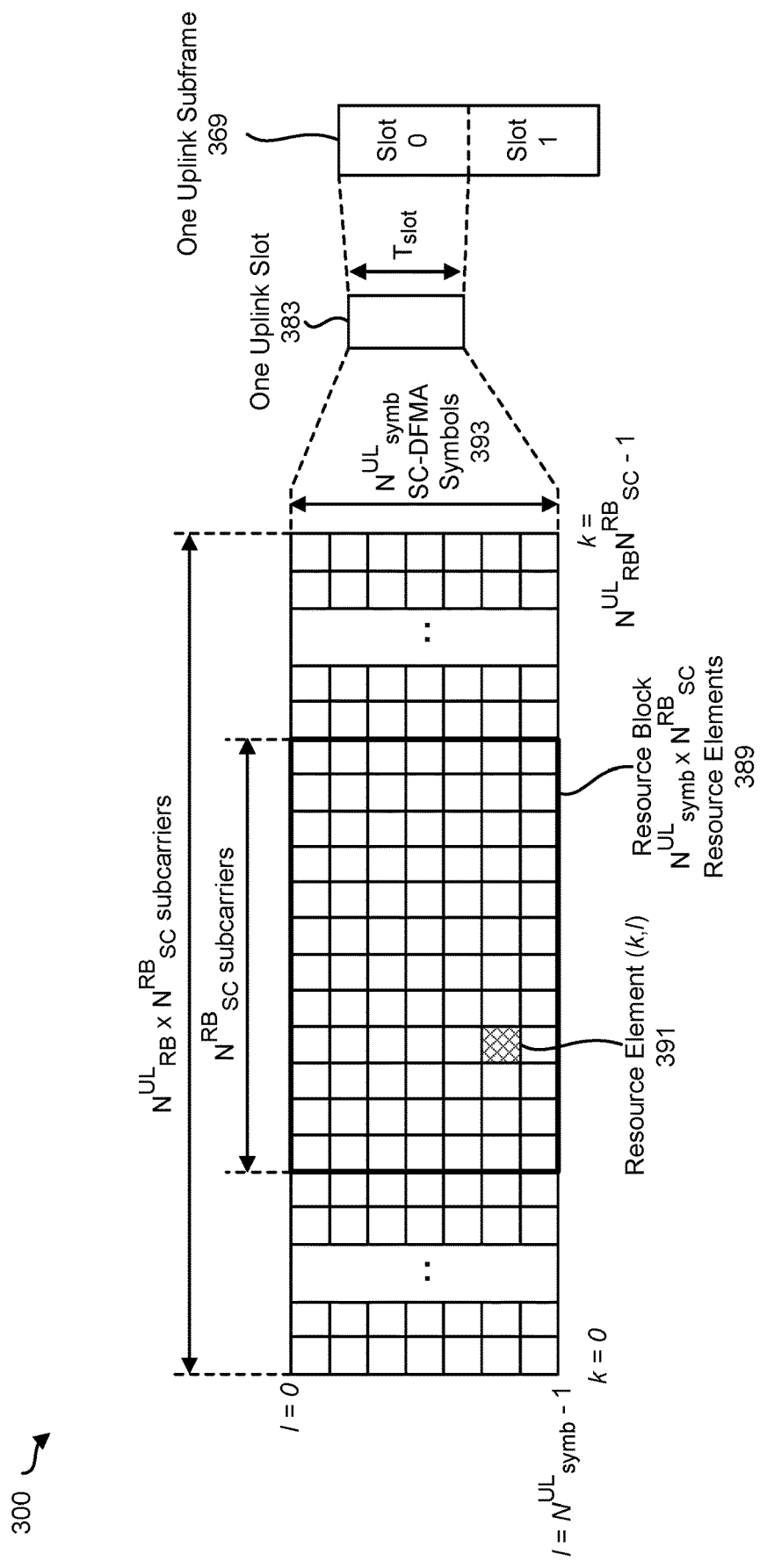
FIG. 3 is a diagram illustrating one example of a resource grid for the uplink.

FIG. 3 is a diagram illustrating one example of a resource grid 300 for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM/DFT-S-OFDM symbols in the time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
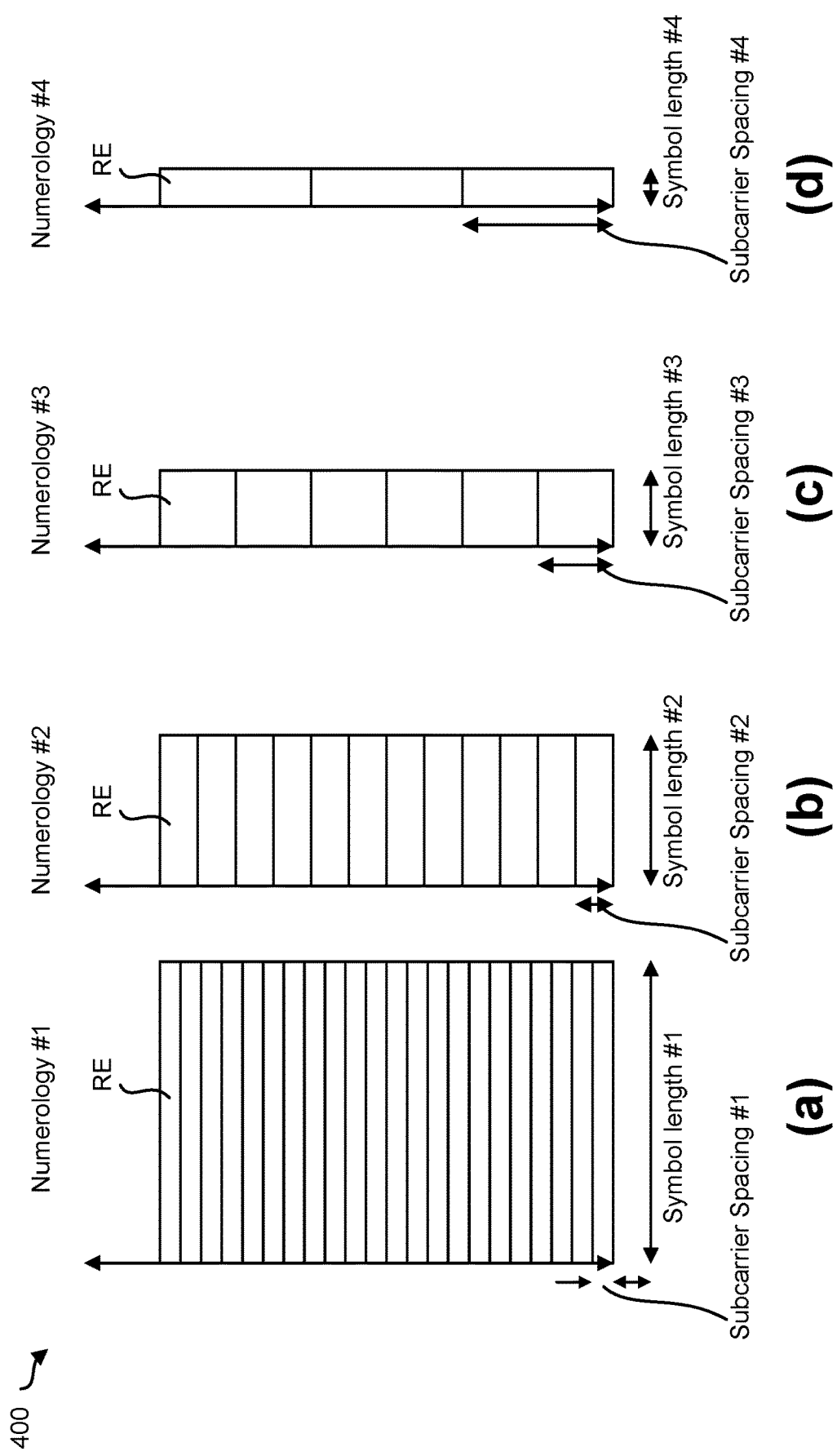
FIG. 4 shows examples of several numerologies.

FIG. 4 shows examples of several numerologies 400. The numerology #1 may be a basic numerology (e.g., a reference numerology). For example, a RE of the basic numerology is defined with subcarrier spacing of 15 kHz in frequency domain and 2048 Ts+CP length (e.g., 160 Ts or 144 Ts) in time domain, where Ts denotes a baseband sampling time unit defined as 1/(15000*2048) seconds. For the i-th numerology, the subcarrier spacing may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
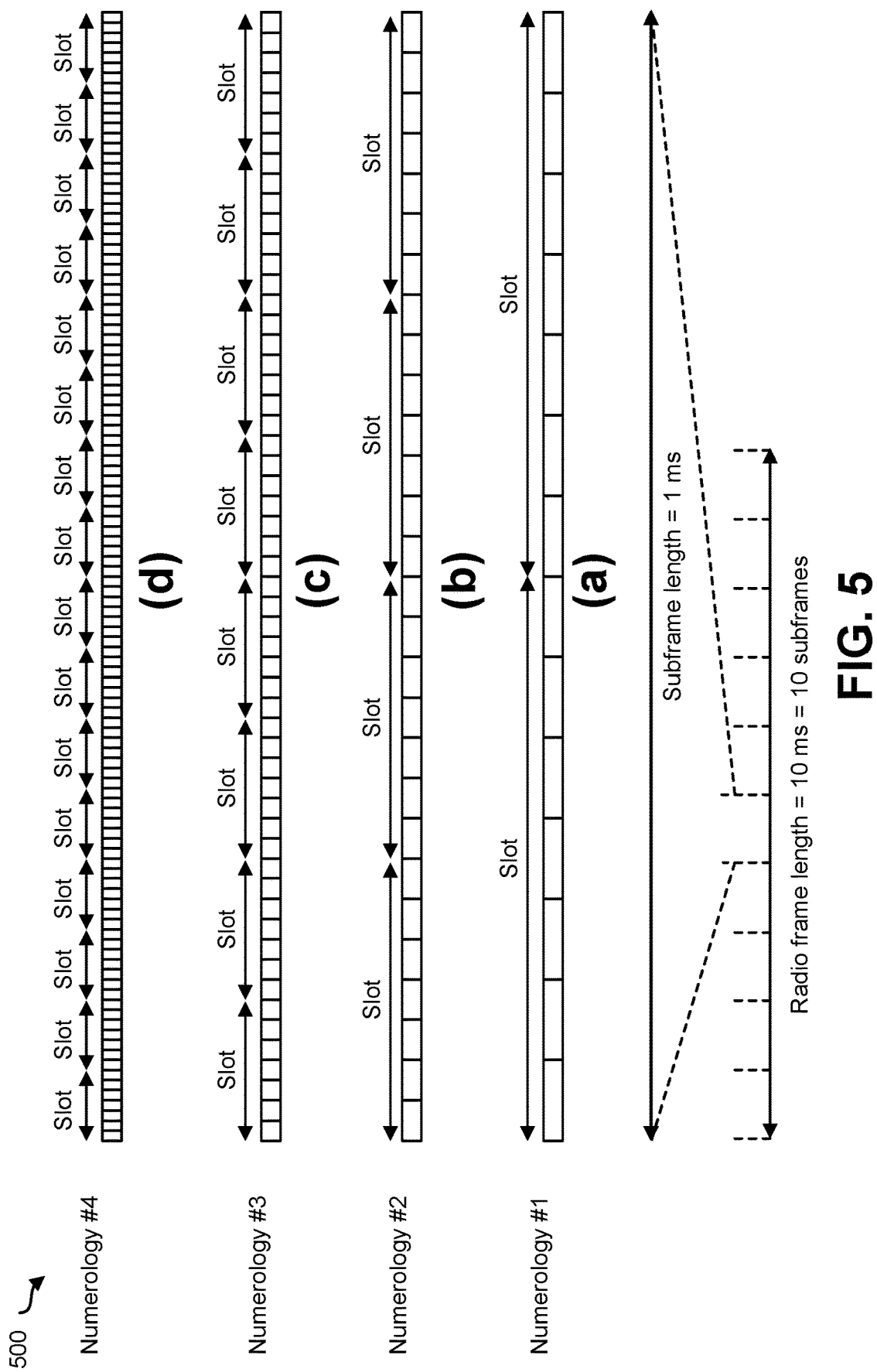
FIG. 5 shows examples of subframe structures for the numerologies that are shown in FIG. 4.

FIG. 5 shows examples of subframe structures 500 for the numerologies that are shown in FIG. 4. Given that a slot includes $N^{DL}_{symb}$ (or $N^{UL}_{symb}$)=7 symbols, the slot length of the i+1-th numerology is a half of the one for the i-th numerology, and eventually the number of slots in a subframe (i.e., 1 ms) becomes double. It may be noted that a radio frame may include 10 subframes, and the radio frame length may be equal to 10 ms.

Figure 6:
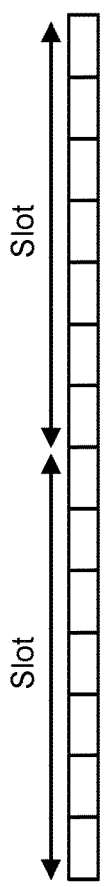
FIG. 6 shows examples of slots and sub-slots.
Figure 6:
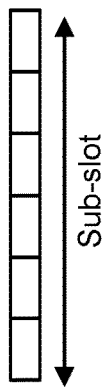
Figure 6:
Figure 6:
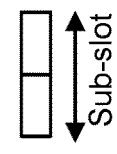
Figure 6:
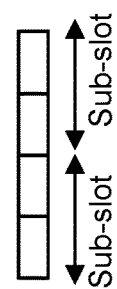
Figure 6:
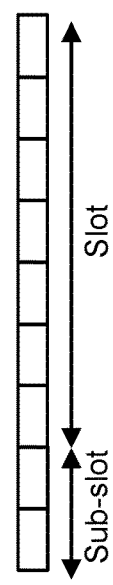

FIG. 6 shows examples 600 of slots and sub-slots. If sub-slot is not configured by higher layer, the UE 102 and the eNB/gNB 160 may only use a slot as a scheduling unit. More specifically, a given transport block may be allocated to a slot. If the sub-slot is configured by higher layer, the UE 102 and the eNB/gNB 160 may use the sub-slot as well as the slot. The sub-slot may include one or more OFDM symbols. The maximum number of OFDM symbols that constitute the sub-slot may be $N^{DL}_{symb}-1$ (or $N^{UL}_{symb}-1$.

The sub-slot length may be configured by higher layer signaling. Alternatively, the sub-slot length may be indicated by a physical layer control channel (e.g., by DCI format).

The sub-slot may start at any symbol within a slot unless it collides with a control channel. There could be restrictions of mini-slot length based on restrictions on starting position. For example, the sub-slot with the length of $N^{DL}_{symb}-1$ (or $N^{UL}_{symb}-1$) may start at the second symbol in a slot. The starting position of a sub-slot may be indicated by a physical layer control channel (e.g., by DCI format). Alternatively, the starting position of a sub-slot may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot.

In cases when the sub-slot is configured, a given transport block may be allocated to either a slot, a sub-slot, aggregated sub-slots or aggregated sub-slot(s) and slot. This unit may also be a unit for HARQ-ACK bit generation.

Figure 7:
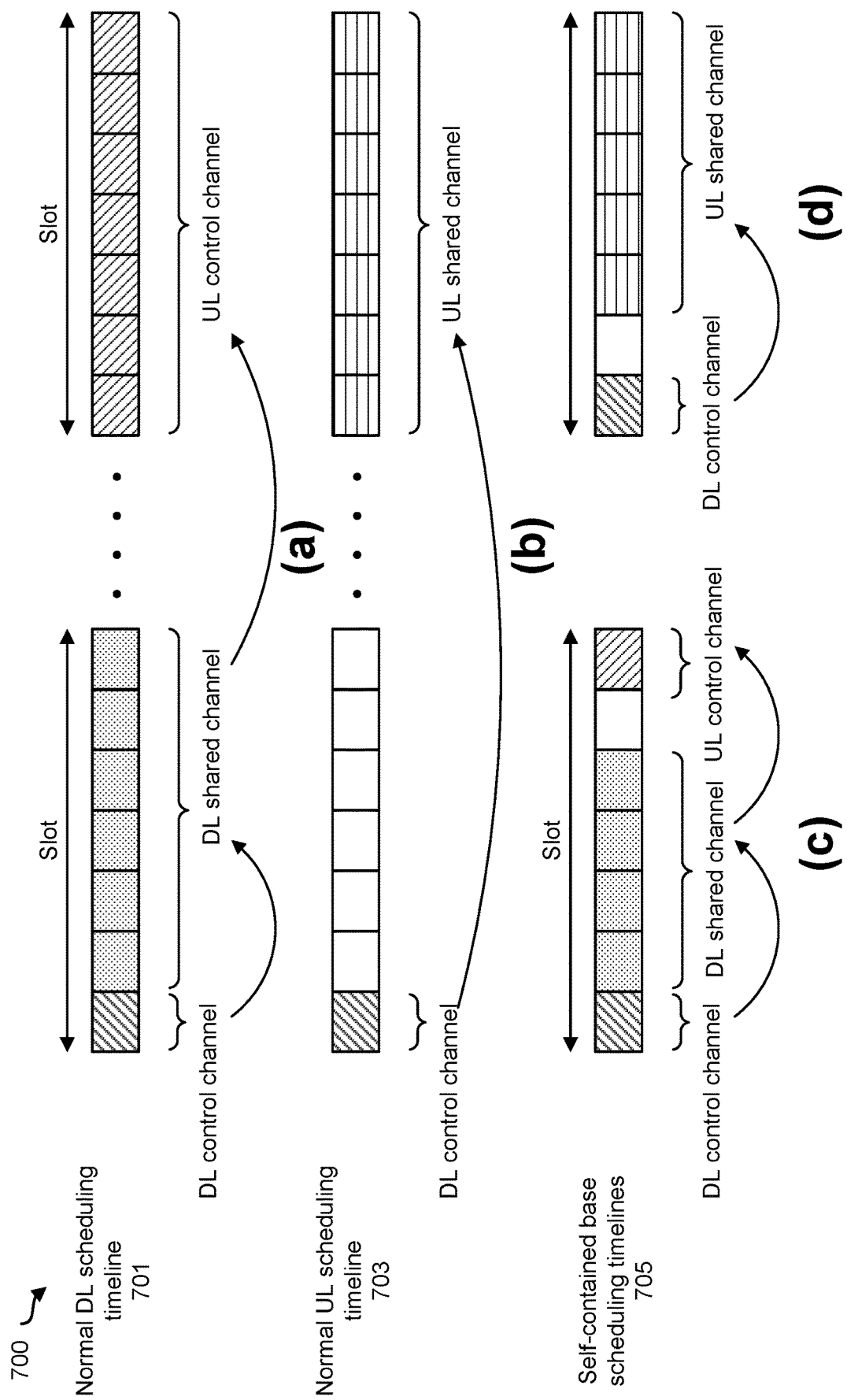
FIG. 7 shows examples of scheduling timelines.

FIG. 7 shows examples of scheduling timelines 700. For a normal DL scheduling timeline 701, DL control channels are mapped in the initial part of a slot. The DL control channels schedule DL shared channels in the same slot. HARQ-ACKs for the DL shared channels (i.e., HARQ-ACKs each of which indicates whether or not transport block in each DL shared channel is detected successfully) are reported via UL control channels in a later slot. In this instance, a given slot may contain either one of DL transmission and UL transmission. For a normal UL scheduling timeline 703, DL control channels are mapped the initial part of a slot. The DL control channels schedule UL shared channels in a later slot. For these cases, the association timing (time shift) between the DL slot and the UL slot may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base 705 DL scheduling timeline, DL control channels are mapped to the initial part of a slot. The DL control channels schedule DL shared channels in the same slot. HARQ-ACKs for the DL shared channels are reported in UL control channels which are mapped at the ending part of the slot. For a self-contained base UL scheduling timeline, DL control channels are mapped to the initial part of a slot. The DL control channels schedule UL shared channels in the same slot. For these cases, the slot may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
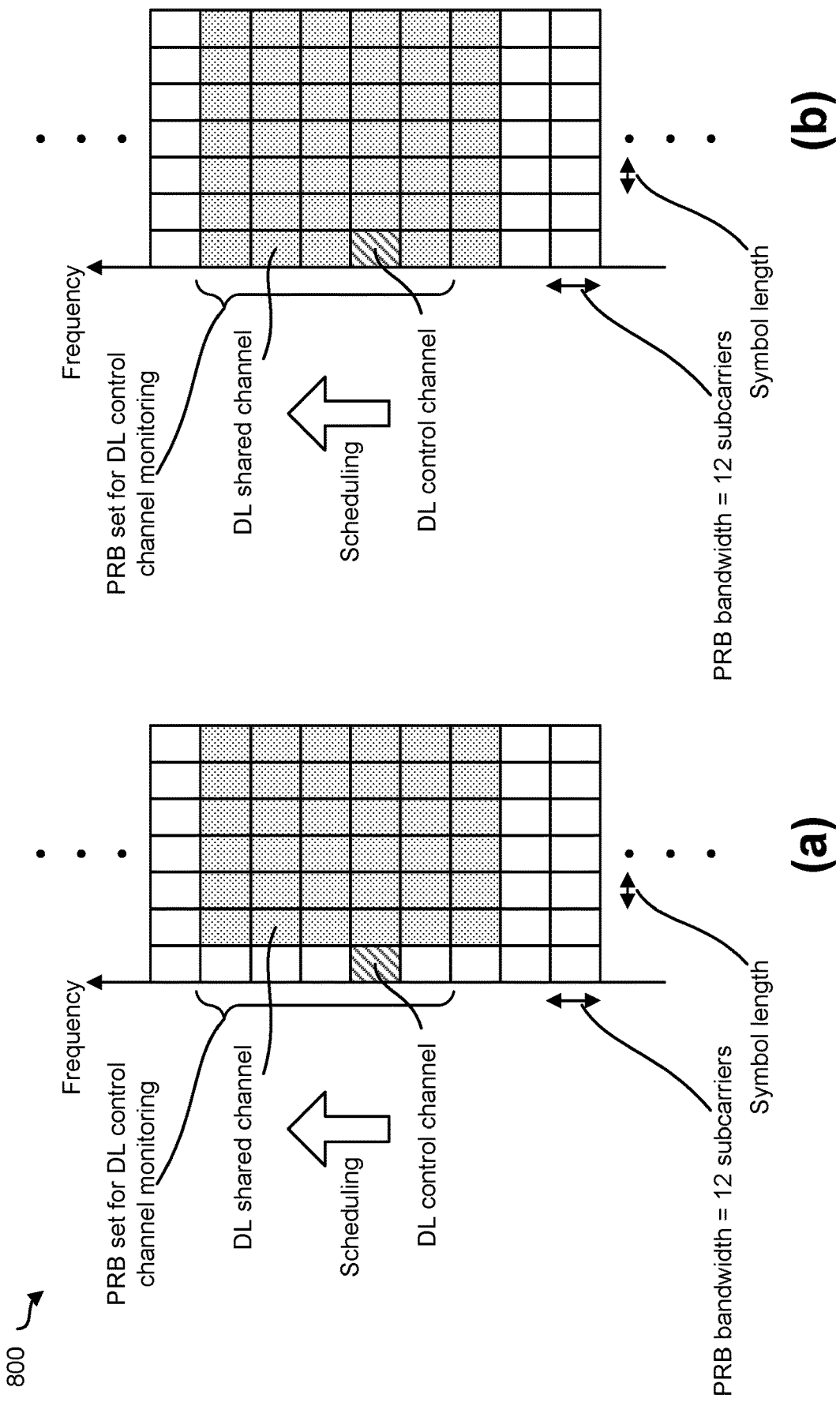
FIG. 8 shows examples of DL control channel monitoring regions.

FIG. 8 shows examples 800 of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include DM-RS) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
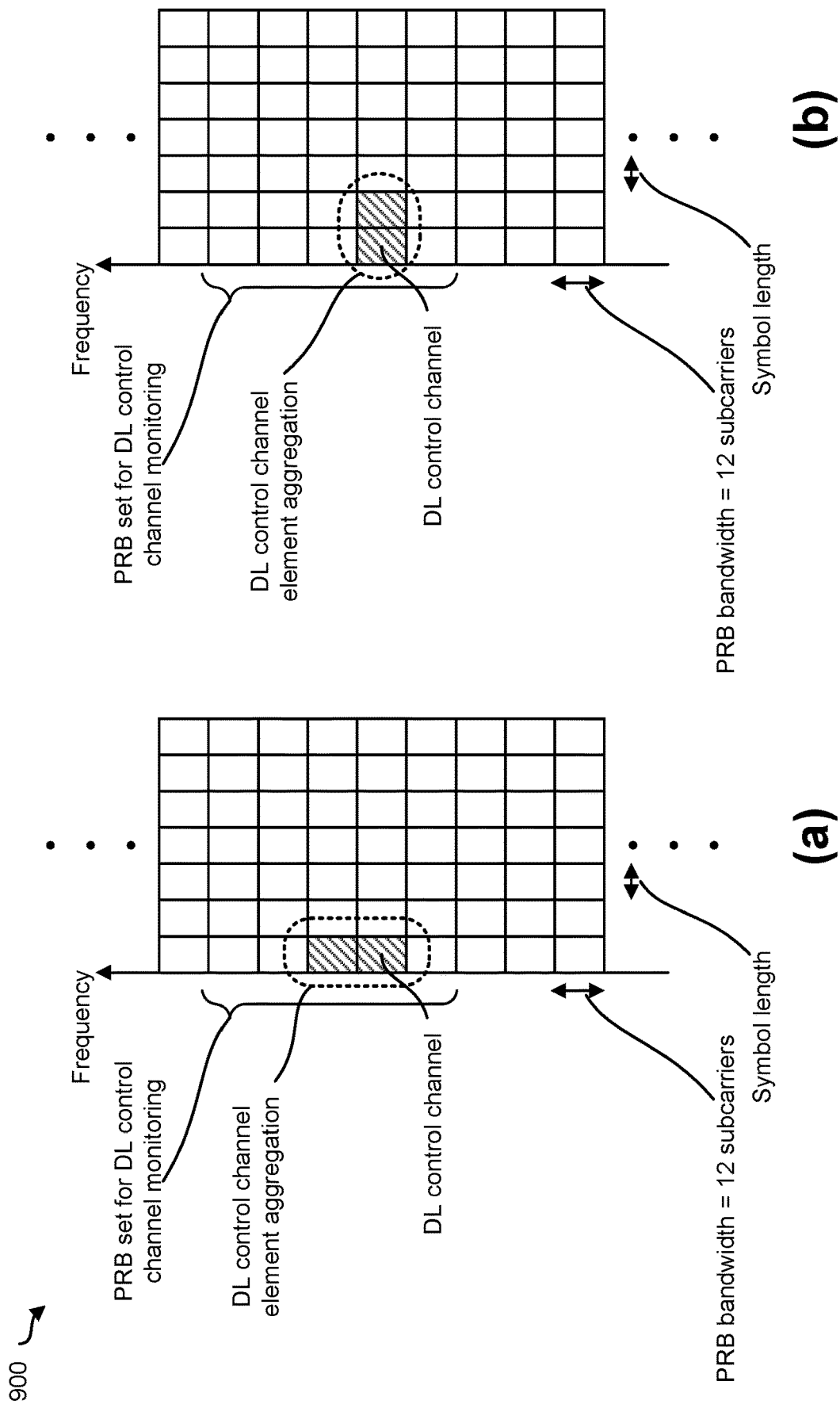
FIG. 9 shows examples of DL control channel which includes more than one control channel elements.

FIG. 9 shows examples 900 of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
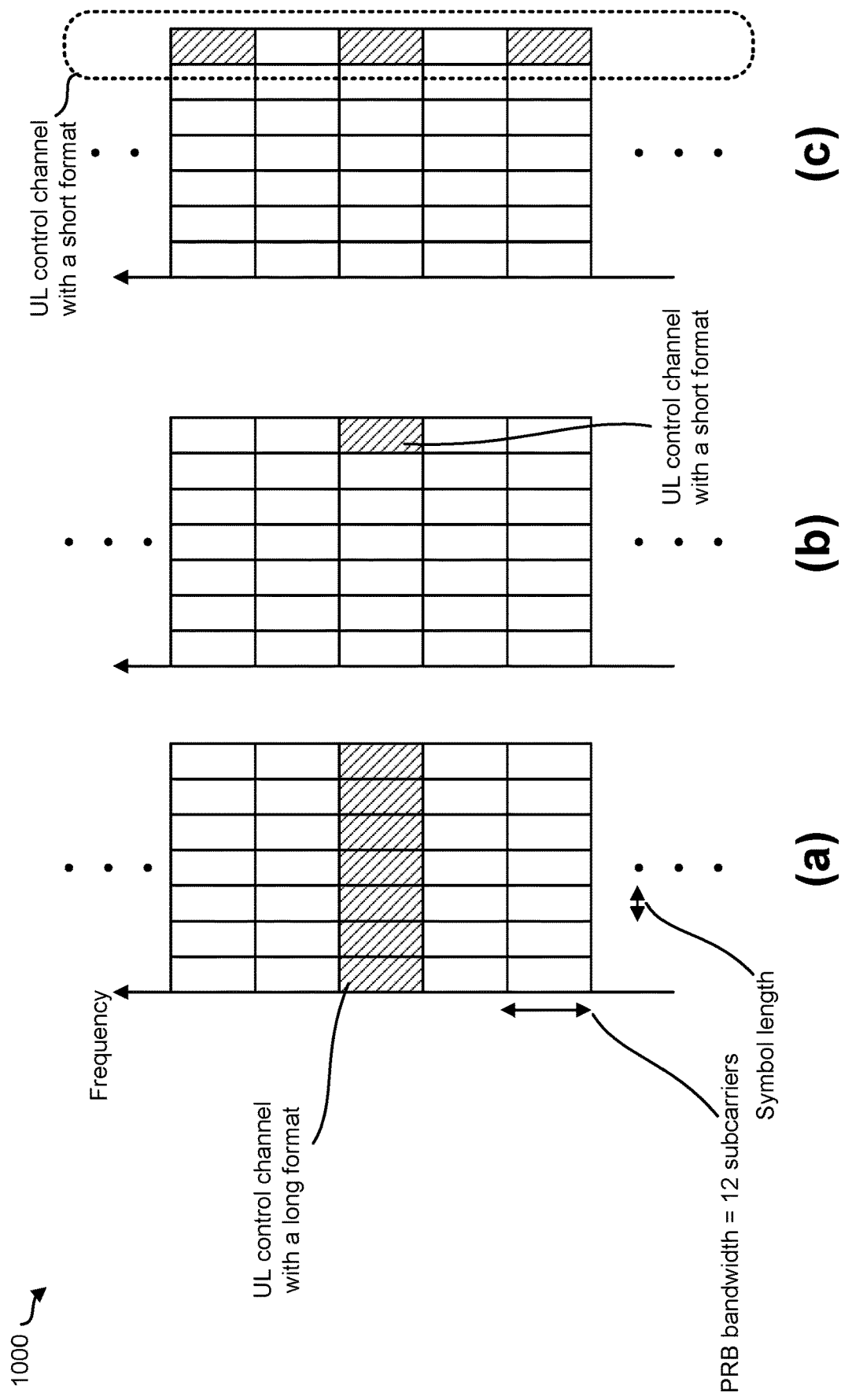
FIG. 10 shows examples of UL control channel structures.

FIG. 10 shows examples of UL control channel structures 1000. UL control channel may be mapped on REs which may be defined based on a PRB and a slot in frequency and time domains, respectively. This UL control channel may be referred to as a long format (or just the 1st format). UL control channels may be mapped on REs on a limited OFDM symbols in the time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g., 5 or 10) within a system bandwidth.

Figure 11:
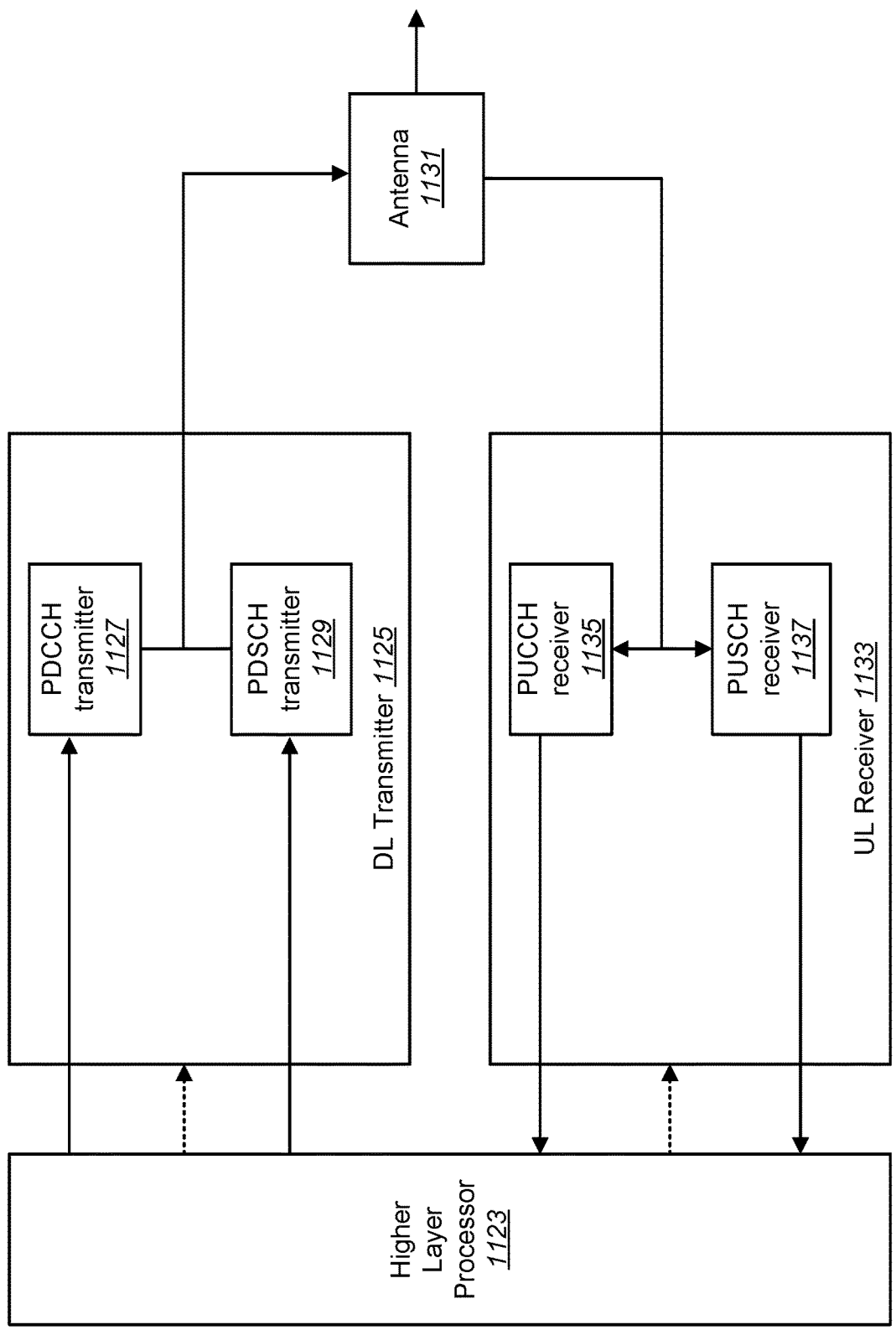
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and antennas 1131. The DL transmitter 1125 may include a PDCCH transmitter 1127 and a PDSCH transmitter 1129. The UL receiver 1133 may include a PUCCH 1135 receiver and a PUSCH receiver 1137. The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter 1129 transport blocks and provide the PDCCH transmitter 1127 transmission parameters related to the transport blocks. The UL receiver 1133 may receive multiplexed uplink physical channels and uplink physical signals via receiving antennas 1131 and de-multiplex them. The PUCCH receiver 1135 may provide the higher layer processor UCI. The PUSCH receiver 1137 may provide the higher layer processor received transport blocks.

Figure 12:
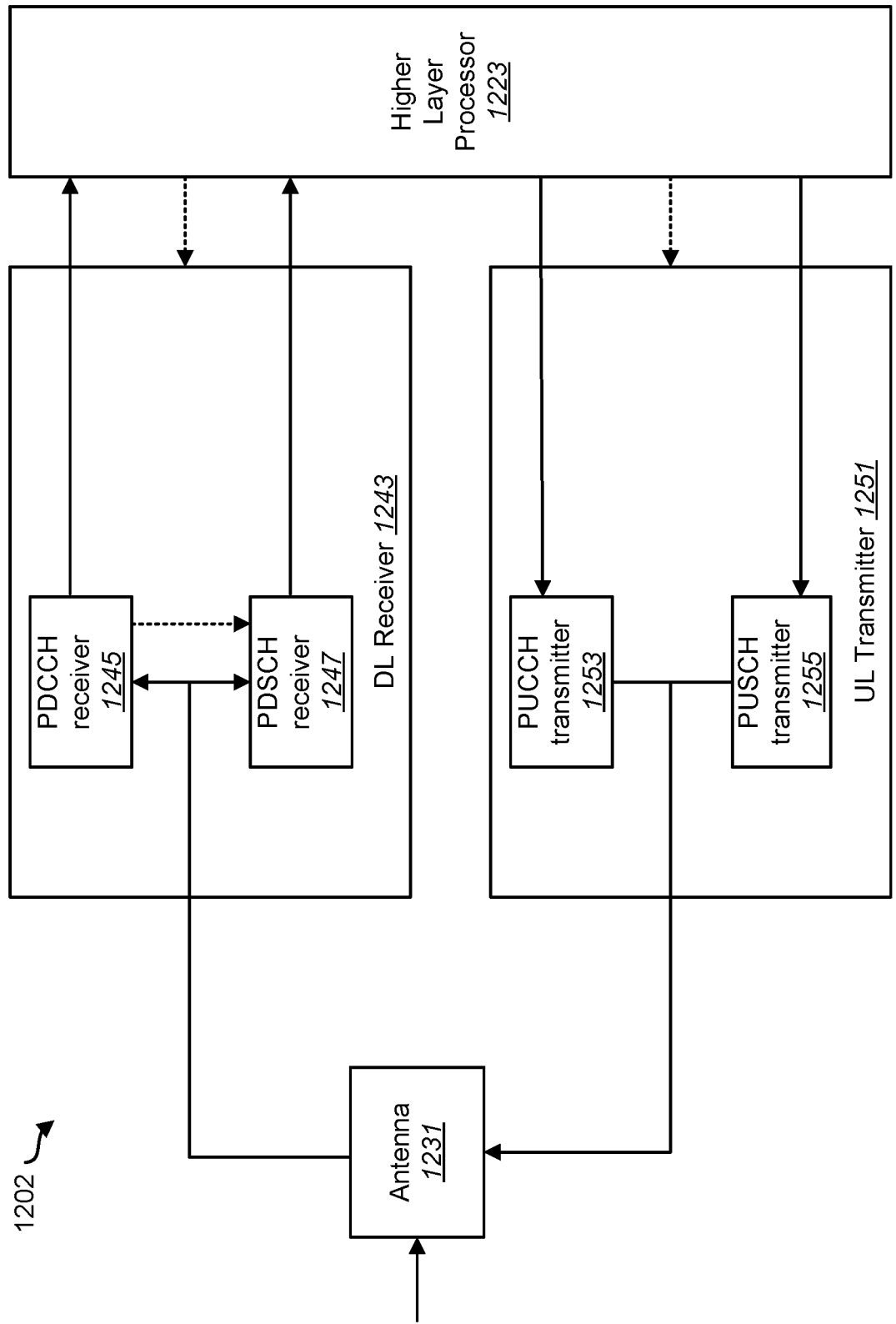
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and antennas 1231. The UL transmitter 1251 may include a PUCCH transmitter 1253 and a PUSCH transmitter 1255. The DL receiver 1243 may include a PDCCH receiver 1245 and a PDSCH receiver 1247. The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter 1255 transport blocks and provide the PUCCH transmitter 1253 UCI. The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
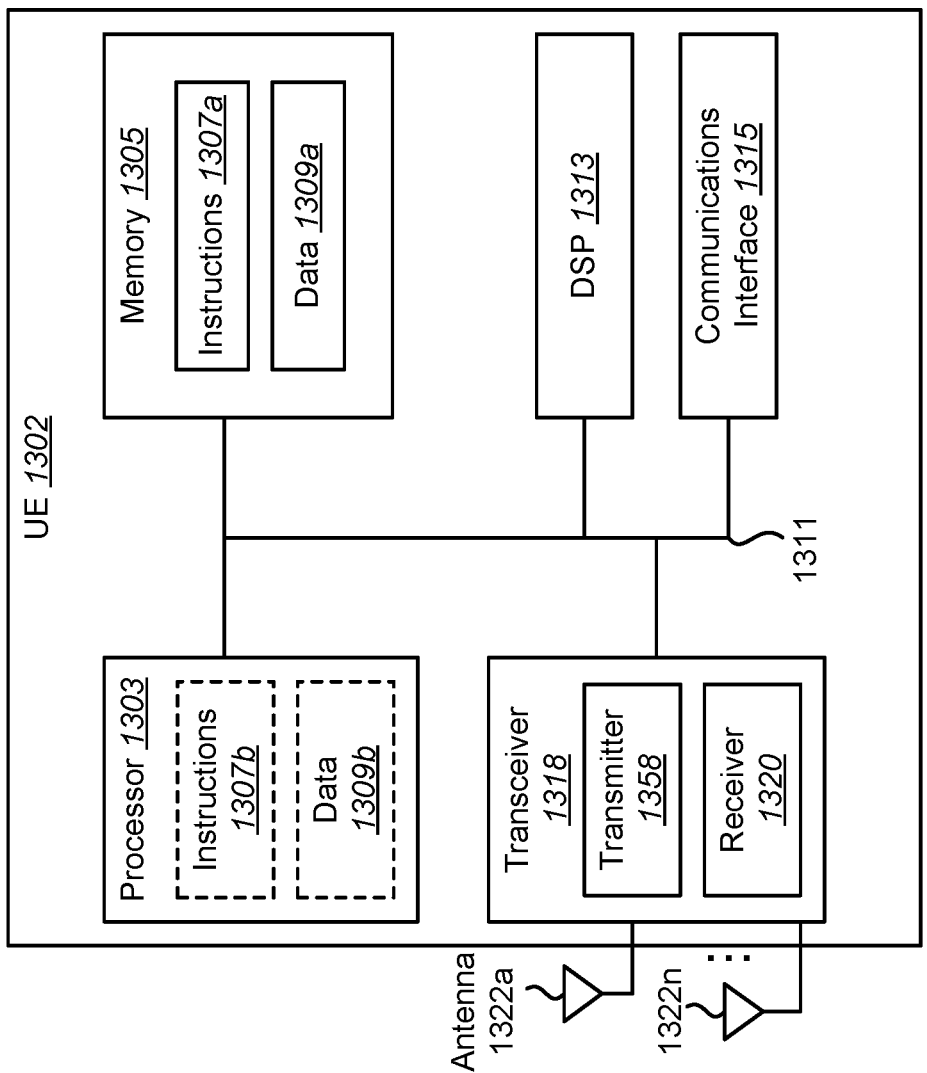
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
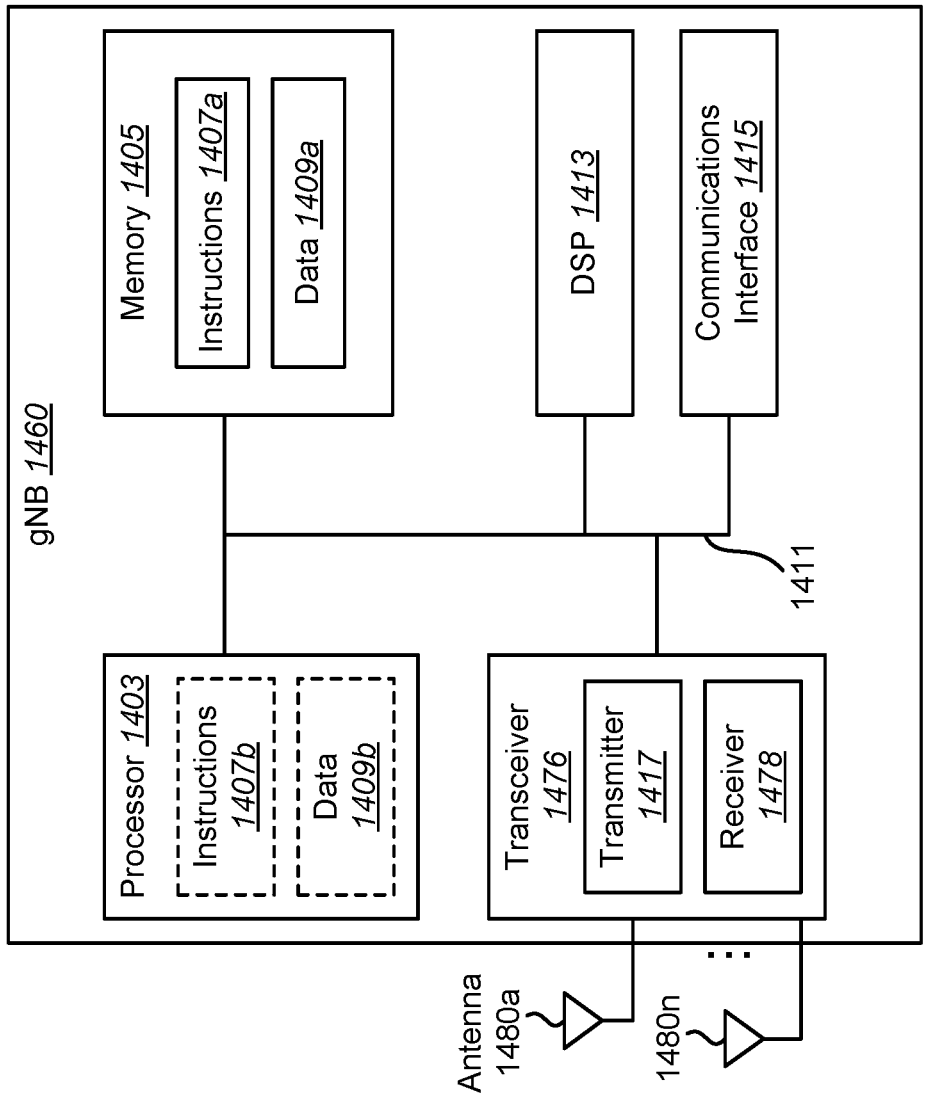
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
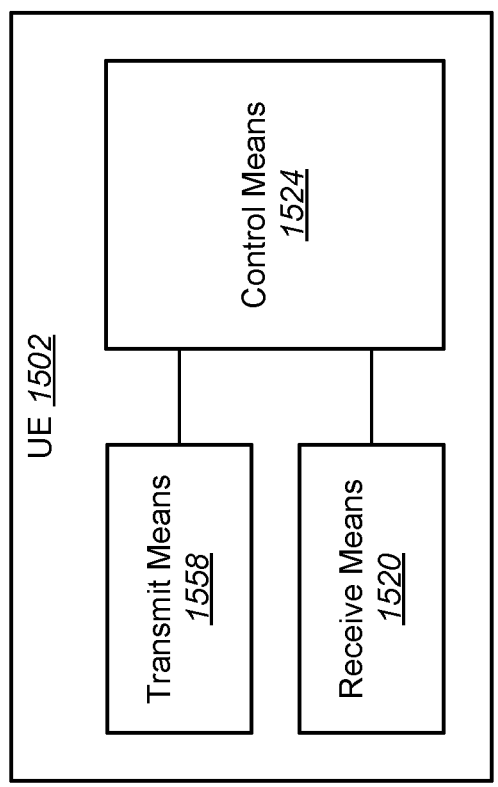
FIG. 15 is a block diagram illustrating one implementation of a UE in which systems and methods for GF uplink transmission operations may be implemented.

FIG. 15 is a block diagram illustrating one implementation of a UE 1502 in which systems and methods for GF uplink transmission operations may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
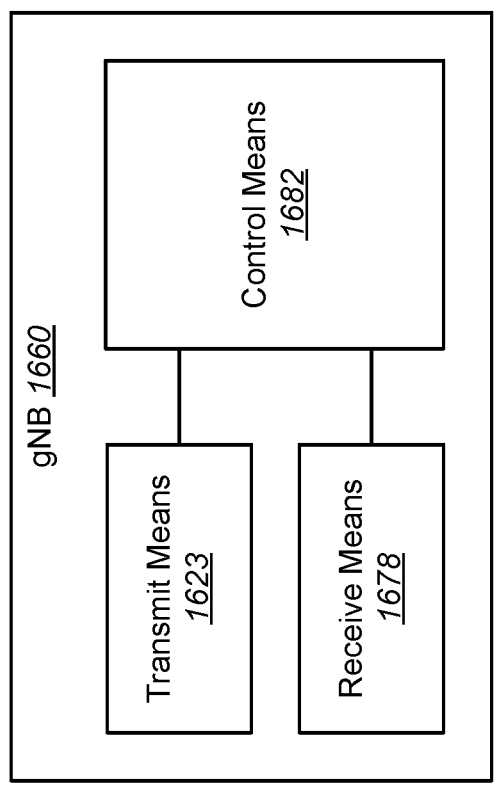
FIG. 16 is a block diagram illustrating one implementation of a gNB in which systems and methods for GF uplink transmission operations may be implemented.

FIG. 16 is a block diagram illustrating one implementation of a gNB 1660 in which systems and methods for GF uplink transmission operations may be implemented. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
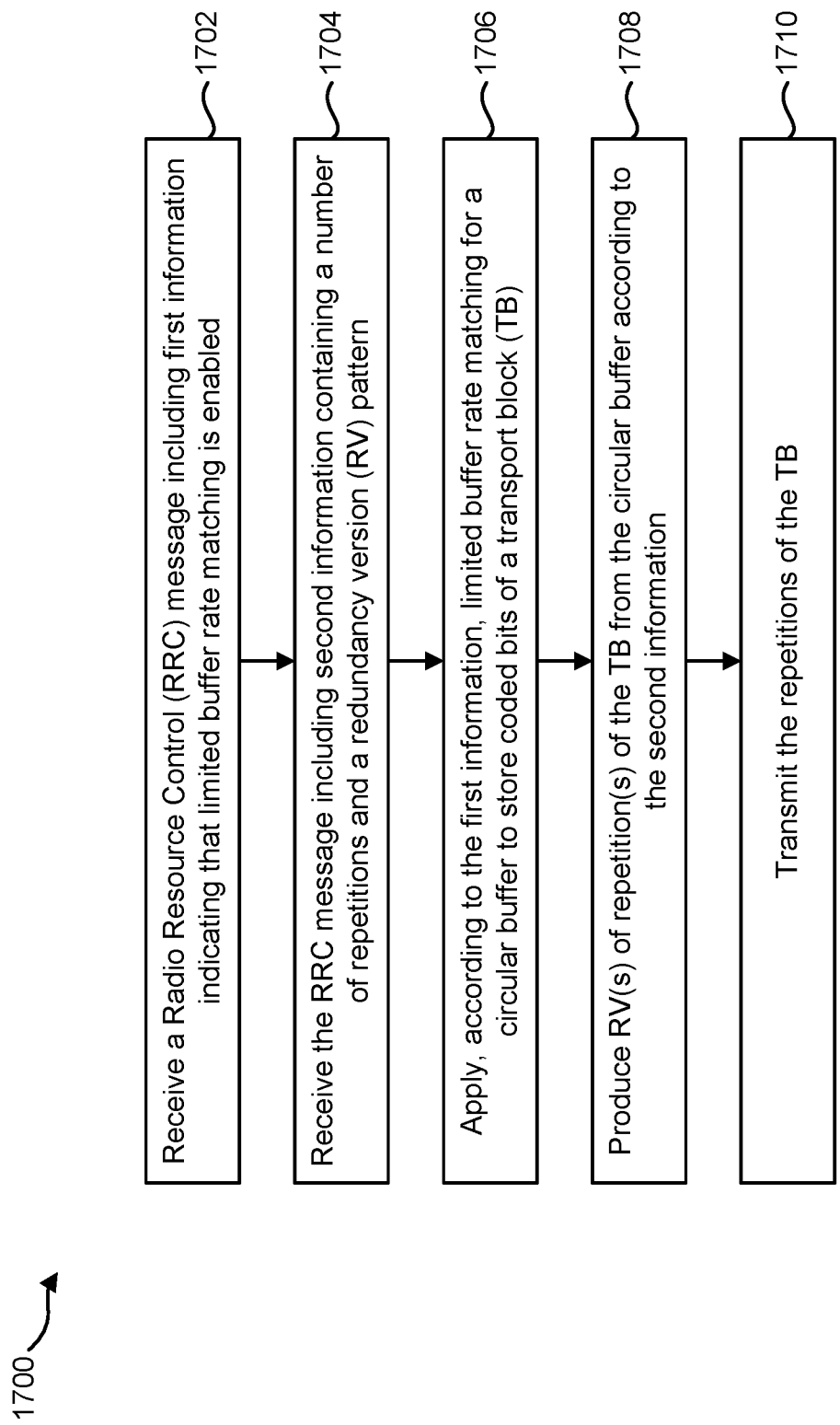
FIG. 17 is a flow diagram illustrating a communication method 1700 of a UE 102.

FIG. 17 is a flow diagram illustrating a communication method 1700 of a UE 102. The UE 102 may receive 1702 a Radio Resource Control (RRC) message including first information indicating that limited buffer rate matching is enabled. The UE 102 may receive 1704 the RRC message including second information containing a number of repetitions and a redundancy version (RV) pattern. The UE 102 may apply 1706, according to the first information, limited buffer rate matching for a circular buffer to store coded bits of a transport block (TB). The UE 102 may produce 1708 RV(s) of repetition(s) of the TB from the circular buffer according to the second information. The UE 102 may transmit 1710 the repetitions of the TB.

Figure 18:
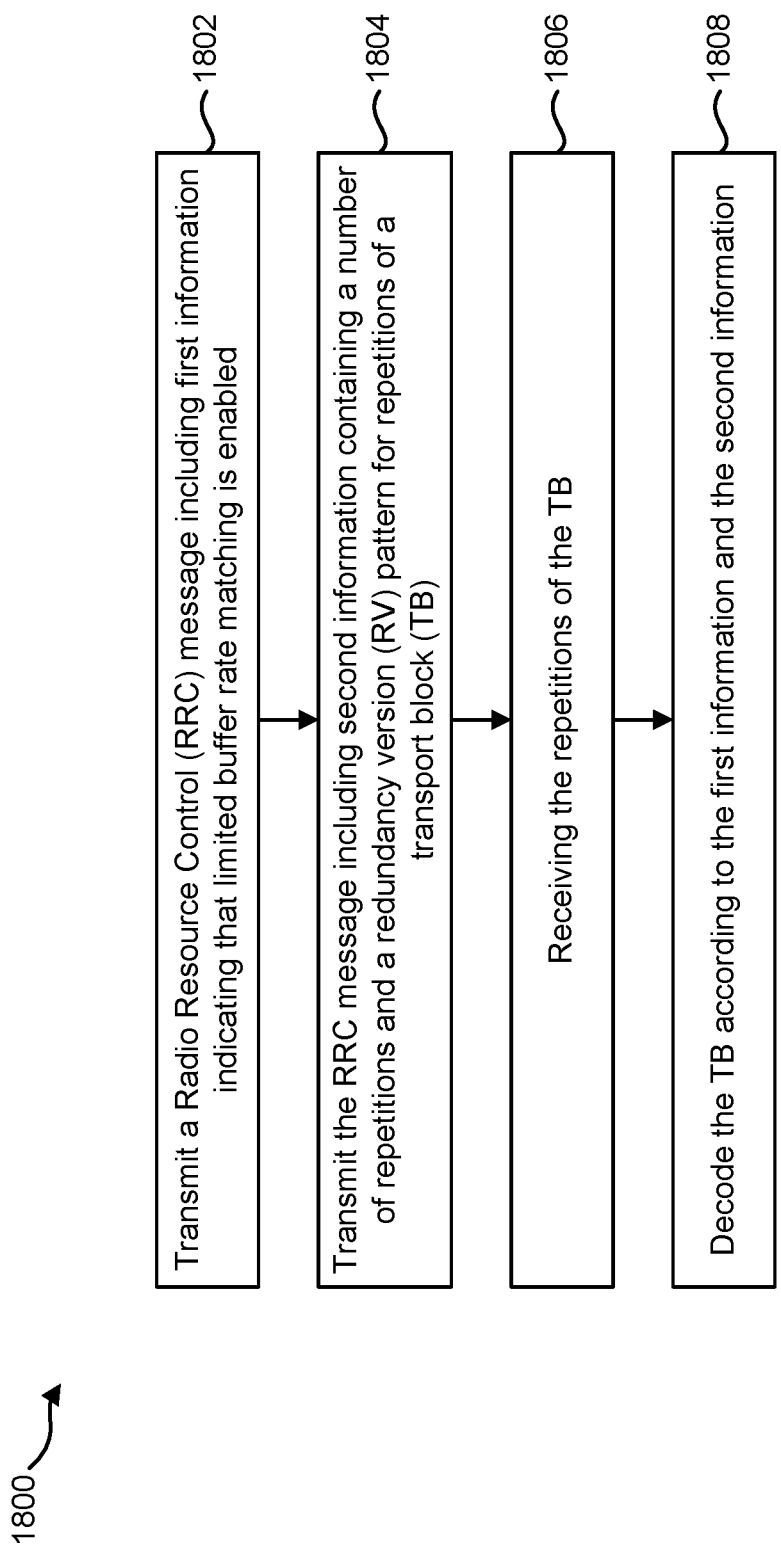
FIG. 18 is a flow diagram illustrating a communication method 1800 of a base stations apparatus.

FIG. 18 is a flow diagram illustrating a communication method 1800 of a base station apparatus 160. The base station apparatus 160 may transmit 1802 a Radio Resource Control (RRC) message including first information indicating that limited buffer rate matching is enabled. The base station apparatus 160 may transmit 1804 the RRC message including second information containing a number of repetitions and a redundancy version (RV) pattern for repetitions of a transport block (TB). The base station apparatus 160 may receive 1806 the repetitions of the TB. The base station apparatus 160 may decode 1808 the TB according to the first information and the second information.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

What is claimed is:

1. A user equipment (UE) that communicates with a base station comprising:
   receiving circuitry configured to receive a Radio Resource Control (RRC) message including:
      first information indicating that more than one configured grant (CG) Physical Uplink Shared Channel (PUSCH) transmission configurations are configured for the UE,
      second information indicating a first frequency resource and a first periodicity for a first configured grant (CG) Physical Uplink Shared Channel (PUSCH) transmission configuration of the more than one CG PUSCH transmission configurations;
      third information indicating a second frequency resource and a second periodicity for a second CG PUSCH transmission configuration of the more than one CG PUSCH transmission configurations; and
      fourth information configuring a timer, a value of the timer being same for all the more than one CG PUSCH transmission configurations; and
   transmitting circuitry configured to:
      perform the first CG PUSCH transmission based on the second information and the value of the timer, and
      perform the second CG PUSCH transmission based on the third information and the value of the timer.

2. A base station apparatus that communicates with a user equipment (UE) comprising:
   transmitting circuitry configured to transmit a Radio Resource Control (RRC) message including:
      first information indicating that more than one configured grant (CG) Physical Uplink Shared Channel (PUSCH) transmission configurations are configured for the UE,
      second information indicating a first frequency resource and a first periodicity for a first configured grant (CG) Physical Uplink Shared Channel (PUSCH) transmission configuration of the more than one CG PUSCH transmission configurations;
      third information indicating a second frequency resource and a second periodicity for a second CG PUSCH transmission configuration of the more than one CG PUSCH transmission configurations; and
      fourth information configuring a timer, a value of the timer being same for all the more than one CG PUSCH transmission configurations; and
   receiving circuitry configured to:
      receive the first CG PUSCH transmission based on the second information and the value of the timer; and
      receive the second CG PUSCH transmission based on the third information and the value of the timer.

3. A communication method of a user equipment comprising:
   receiving a Radio Resource Control (RRC) message including:
      first information indicating that more than one configured grant (CG) Physical Uplink Shared Channel (PUSCH) transmission configurations are configured for the UE,
      second information indicating a first frequency resource and a first periodicity for a first configured grant (CG) Physical Uplink Shared Channel (PUSCH) transmission configuration of the more than one CG PUSCH transmission configurations;
      third information indicating a second frequency resource and a second periodicity for a second CG PUSCH transmission configuration of the more than one CG PUSCH transmission configurations; and
      fourth information configuring a timer, a value of the timer being same for all the more than one CG PUSCH transmission configurations;
   performing the first CG PUSCH transmission based on the second information and the value of timer; and
   performing the second CG PUSCH transmission based on the third information and the value of the timer.

4. A communication method of a base station apparatus comprising:
   transmitting a Radio Resource Control (RRC) message including:
      first information indicating that more than one configured grant (CG) Physical Uplink Shared Channel (PUSCH) transmission configurations are configured for the UE,
      second information indicating a first frequency resource and a first periodicity for a first configured grant (CG) Physical Uplink Shared Channel (PUSCH) transmission configuration of the more than one CG PUSCH transmission configurations;
      third information indicating a second frequency resource and a second periodicity for a second CG PUSCH transmission configuration of the more than one CG PUSCH transmission configurations; and
      fourth information configuring a timer, a value of the timer being same for all the more than one CG PUSCH transmission configurations;
   receiving the first CG PUSCH transmission based on the second information and the value of the timer; and
   receiving the second CG PUSCH transmission based on the third information and the value of the timer.

* * * * *